United States Patent [19]
Hayashi et al.

[11] Patent Number: 6,081,386
[45] Date of Patent: Jun. 27, 2000

[54] OPTICAL SCANNING LENS, OPTICAL SCANNING AND IMAGING SYSTEM AND OPTICAL SCANNING APPARATUS INCORPORATING SAME

[75] Inventors: Yoshinori Hayashi, Kawasaki; Seizo Suzuki, Yokohama; Koji Masuda, Tokyo; Hiroyuki Suhara, Yokohama, all of Japan

[73] Assignee: Ricoh Company, Ltd., Japan

[21] Appl. No.: 09/060,769

[22] Filed: Apr. 15, 1998

[30] Foreign Application Priority Data

| Apr. 15, 1997 | [JP] | Japan | 9-0977087 |
| Jun. 19, 1997 | [JP] | Japan | 9-162616 |
| Jul. 14, 1997 | [JP] | Japan | 9-188617 |
| Mar. 5, 1998 | [JP] | Japan | 10-053628 |

[51] Int. Cl.[7] .............................. G02B 27/30; G11B 7/00
[52] U.S. Cl. ........................ 359/641; 369/112; 369/116
[58] Field of Search ........................... 359/641; 369/112, 369/116

[56] References Cited

U.S. PATENT DOCUMENTS 5,117,309  5/1992  Aoki ........................................ 359/654

FOREIGN PATENT DOCUMENTS 9-49976  2/1997  Japan .

Primary Examiner—Georgia Epps
Assistant Examiner—Michael A Lucas
Attorney, Agent, or Firm—Graham & James LLP

[57] ABSTRACT

An optical scanning lens and an optical scanning and imaging system for use in an optical scanning apparatus for scanning a surface of an optical recording medium, such as a photosensitive material, for writing data thereupon, is constructed to produce a minimum beam spot diameter, in a sub-scanning direction, within a desired range, while also reducing variation in a scanning line pitch and reducing variation in beam spot diameter according to an image height for every point along a scanning surface by determining and compensating for a non-uniform distribution of refractive indices in an optical scanning lens used in the optical scanning imaging system, before designing and manufacturing the optical scanning lens.

27 Claims, 15 Drawing Sheets

FIG. 1D
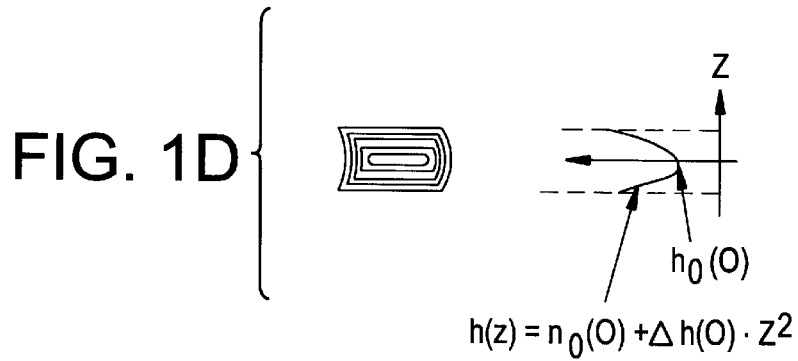
$h(z) = n_0(O) + \Delta h(O) \cdot Z^2$
FIG. 2
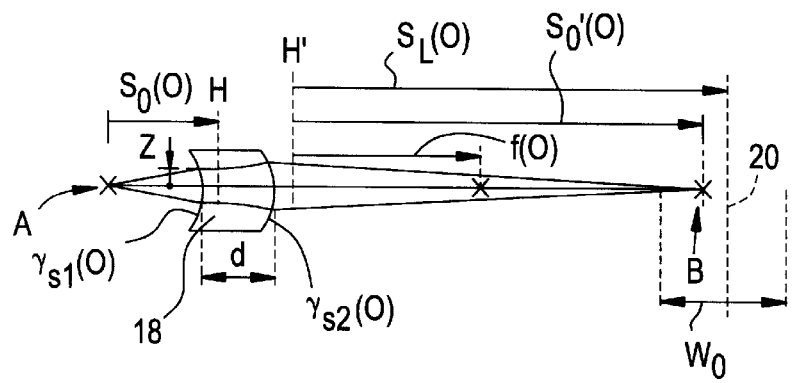
FIG. 3A
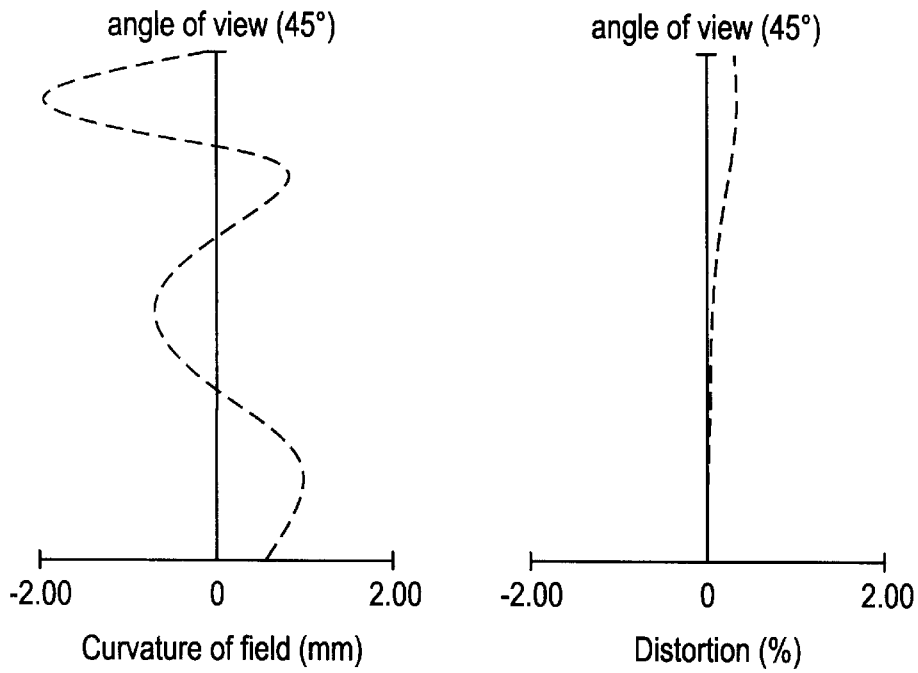
angle of view (45°)
Curvature of field (mm)
FIG. 3B
angle of view (45°)
Distortion (%)

Lens height (mm)

Spherical Aberration

Lens height (mm)

Spherical Aberration

Lens height (mm)

Spherical Aberration

Lens height (mm)

Spherical Aberration

Lens height (mm)

Spherical Aberration

Lens height (mm)

Spherical Aberration

Angle of view 45°

Curvature of Field (mm) in main scanning direction

Angle of view 45°

Distortion (%)

Field of curvature in main scanning direction

Constant speed characteristics

Field of curvature in sub-scanning direction

Curvature of field

-2.00    2.00

Constant velocity

-1.00    1.00 (%)

OPTICAL SCANNING LENS, OPTICAL SCANNING AND IMAGING SYSTEM AND OPTICAL SCANNING APPARATUS INCORPORATING SAME

BACKGROUND OF THE INVENTION

1. Field of the Invention

The present invention relates to an optical scanning lens and an optical scanning and imaging system for use in an optical scanning apparatus for scanning a surface of an optical recording medium, such as a photosensitive material, for writing data thereupon, and, in particular, to an optical scanning lens and an optical scanning and imaging system which is constructed to produce a minimum beam spot diameter, in a sub-scanning direction, within a desired range; to reduce variation in a scanning line pitch; and to reduce variation in beam spot diameter according to an image height for every point along a scanning surface, which variations are caused by non-uniformity of the refractive index in a lens used in the optical scanning imaging system.

2. Description of the Related Art

An optical scanning apparatus for scanning a surface of an optical recording medium, such as a photosensitive material, for writing data thereupon, is well known in relation to digital copying machines, laser printers, or the like.

In such an optical scanning apparatus, a usual optical arrangement is such that a laser beam from a light source is deflected by a rotating light deflector, such as a polygon mirror, and the deflected light then is transmitted to a scanning and image forming lens system such that the light is converged to form a light spot or beam spot to be applied on a surface to be scanned for scanning the surface for writing data thereupon. The scanning lens is therefore required to meet constant velocity characteristics such as fθ characteristics and various optical characteristics including correction of curvature of field. Also, in such an optical scanning apparatus, the system of lenses for scanning and image formation which converges a light beam deflected by a light deflector as a light spot or beam spot on a scanned surface has been designed based on the assumption that the refractive index inside a lens is constant.

However, as described below, the plastics molding lens forming process used to form such a lens often leads to a variable refractive index inside the lens which causes many problems described in more detail below.

It has been difficult to achieve the required and desired lens characteristics solely by forming the surface of the lens system to have a spherical surface. Thus, it has been recently attempted to provide a lens having a special surface such as a non-spherical surface to achieve the necessary optical characteristics.

Such a lens having a non-spherical surface is generally manufactured using a plastics molding process. When a lens is made using the plastics molding process, molten plastics material is poured into a mold having a desired pattern for a lens surface. When the molten plastics in the mold is cooled, the temperature of the plastics gradually decreases starting from the part of the plastics material which is in contact with a surface of the mold and extending toward the inner-most part of the plastics material in the mold which is located farthest away from the mold surface. Therefore, differences in the temperature of the plastics material arise, especially between a center potion of the lens and a peripheral portion of the lens. Due to this difference in the temperature, some of the molten plastics material moves toward the part of the mold where the temperature has decreased or is the lowest. As a result, when the molded plastics material is completely cooled, the density of the plastics material is higher at the peripheral portions of the lens where the temperature had started to decrease earlier than the center portion of the lens where the temperature started to decrease later than the peripheral portions.

Thus, when a lens is produced with a plastics molding process, the density of the inner portion of the lens is lower than the density of the outer-circumferential portion thereof due to the influence of a temperature difference between the inner part and the outer circumferential part thereof, which occurs when the lens is cooled in a mold. This phenomenon produces a non-uniform density of plastics material in the inner part of the aspherical lens.

Such non-uniformity of density of plastics causes non-uniformity of the refractive index in the lens. The refractive index is high where the density of plastics is high. Therefore, the refractive index of the peripheral portions of the lens is higher than the refractive index of the center portion.

The non-uniformity of the refractive index affects the optical characteristics of the lens and causes the optical performance of a system of lenses for scanning and image formation to be different from a desired level. In addition, the non-uniformity causes variation in scanning line pitch and diameter of a light spot or beam spot according to an image height. Furthermore, the non-uniformity of the refractive index is increased if cooling time is shortened. This makes it difficult to reduce the time and cost required to make the lens using the plastics molding process which is necessary to make a non-spherical lens.

The optical scanning and image forming lens is shaped so as to function as an image forming lens for a deflected light flux. Therefore, the lens is generally formed to have a shape which has a shorter width in a direction corresponding to the sub-scanning direction on the optical path from the light source to the scanned surface. Consequently, a decrease in temperature occurs rapidly at both end parts of the lens in the sub-scanning direction. As a result, the variation of the refractive index in the lens is increased in the sub-scanning direction. Thus, the optical performance in the sub-scanning direction is especially affected.

FIGS. 25(a)–25(e) are schematic drawings and charts illustrating an example of a distribution of refractive indices in a scanning lens.

FIG. 25(a) is a schematic drawing illustrating an example of a distribution of refractive indices in an optical lens 1 in the main scanning direction at a virtual cross section of the optical lens 1 in a plane which includes the optical axis and is perpendicular to the scanned surface, illustrated via contour lines. Each contour line in the FIGS. 25(a)–25(e) indicates a line where the refractive index changes. FIG. 25(b) is a drawing illustrating a distribution of refractive indices in the main scanning direction at the virtual cross section illustrated in FIG. 25(a) at the center portion of the thickness-wise direction of the lens, which is indicated by a line-and-dot line in FIG. 25(a). FIG. 25(c) is a drawing illustrating distribution of refractive indices of the lens 1 in the sub-scanning direction at a virtual cross section of the lens 1 in a plane which includes the optical axis and is parallel to the sub-scanning direction, illustrated via contour lines. FIG. 25(d) is a drawing illustrating distribution of refractive indices at the virtual cross section in a plane parallel to the sub-scanning direction including the optical axis. FIG. 25(e) is a drawing illustrating distribution of refractive indices at a cross section at the center of the thickness-wise direction of the lens in FIG. 25(c).

As illustrated in FIGS. 25(a)–25(e), the refractive index in the lens becomes greater at increasing distances from a center towards the peripheral parts of the lens. This is due to the peripheral parts of the lens being cooled more rapidly than the central part of the lens. As a result, the density of the plastics in the peripheral parts of the lens becomes high compared to the central part of the lens.

An optical scanning and image forming lens system is generally designed, regardless of whether the lens system is made of plastics or includes a plastic lens, based upon the assumption that the refractive index in the lens is uniform. Therefore, if the distribution of the refractive index is not uniform, then the lens system will not perform according to desired optical characteristics. Accordingly, when designing a lens system including a plastic lens, for accomplishing a desired optical performance with the lens system, careful consideration needs to be given to distribution of refractive indices in the lens.

Japanese laid-open patent application No. 9-49976 discloses an example of an optical scanning and image forming lens system in which consideration is given to distribution of refractive indices in the lens. In this example, the diameter of a light spot or beam spot in the sub-scanning direction is minimized by forming an image plane having a least wavefront aberration in the sub-scanning direction at the surface to be scanned by considering the distribution of refractive indices in the lens.

Although the scanning lens described in Japanese laid-open patent application No. 9-49976 has a positive power, the refractive index is greater at locations closer to the peripheral portions as compared to locations closer to the center portion of the lens as described above. Therefore, a converging position of a light spot or beam spot, which needs to be located precisely at the surface to be scanned, generally shifts to a position which is spaced away from a desired position relative to a light deflector. To correct for this phenomenon, the position of the lens in Japanese laid-open patent application No. 9-49976 is shifted in one direction by an amount which is not specified.

In such lenses, the diameter of a light spot or beam spot which scans the surface to be scanned changes as the image height changes in accordance with curvature of field of the optical scanning lens. Further, if the refractive index is not uniform in the lens, the diameter of the light spot is also varied due to the non-uniform distribution of the refractive indices in the lens.

FIG. 27 is a drawing explaining that the diameter of a light spot used to scan the surface to be scanned increases when the distribution of refractive indices of the optical scanning lens is not uniform. In FIG. 27, the vertical axis indicates a size of the diameter of a light spot on the surface to be scanned and the horizontal axis indicates an amount of defocusing (a distance between an image forming position, i.e., a converging position, of a light spot and the position of the surface to be scanned).

When the distribution of the refractive index is uniform in the optical scanning lens, the relation between the defocusing amount and the diameter of a light spot is as indicated by the dotted line in the FIG. 27 and the diameter of the light spot is minimum at the surface to be scanned. When the distribution of the refractive index is not uniform in the lens, the relation between the defocusing amount and the diameter of the light spot is as indicated by the solid line in FIG. 27. As illustrated in the FIG. 27, the diameter of the light spot at the surface to be scanned is larger than the diameter as designed by a length indicated by L when the distribution of the refractive index of the lens is not uniform.

Therefore, when designing a scanning lens, if the distribution of refractive indices in the lens is not considered, variation in the diameter of a light spot according to the image height increases, which consequently deteriorates the quality of an image to be formed by optical scanning through the scanning lens.

As described above, an optical scanning and image forming lens system is generally designed, regardless of whether the lens system is made of plastics or includes a plastic lens, based upon the assumption that the distribution of the refractive index in the lens is uniform. Therefore, if the distribution of the refractive index is not uniform, then the lens system will not perform according to the designed optical characteristics. Accordingly, when designing a lens system including a plastic lens, for accomplishing a desired optical performance with the lens system, careful consideration needs to be given to the distribution of refractive indices in the lens.

As one of the important characteristic of an optical scanning device, a scanning line pitch, that is, a distance between neighboring scanning lines, is required to be constant. When the scanning line pitch is not uniform, an image written as a result of the scanning will be distorted due to scanning line pitch variation. Therefore, for writing a high quality image, the scanning pitch variation needs to be minimized.

The scanning line pitch variation is mainly caused by a surface inclination of a polygon mirror used as a deflector. When a deflecting reflective surface of the polygon mirror is not substantially parallel to the rotating axis of the polygon mirror, then a deflected beam is shifted to the sub-scanning direction according to the inclination of each deflecting reflective surface. As a result, the image forming position of the light beam is dislocated in the sub-scanning direction on the surface to be scanned, thus causing variation in the scanning line pitch.

A prior art method of correcting scanning line pitch variation is a so-called surface inclination correction method. In the surface inclination correction method, a beam from the light source is formed as a linear image elongated in the main scanning direction located near a deflecting reflective surface of a polygon mirror and a conjugate relationship is established via an optical scanning and imaging system located between the position near the deflecting reflective surface of the polygon mirror and the position of the scanning surface.

However, when the refractive index of a lens used in the scanning and imaging system is not uniform, even when the above surface inclination correction method is performed, if the refractive index distribution in the lens is not considered and compensated for in the correction process, scanning line pitch variation is caused by the non-uniformity of the refractive index in the lens.

Further, because the rotational axis of the deflecting reflective surface of the polygon mirror deviates from the surface of the polygon mirror, the imaging position of the linear image is deviated from the deflecting reflective surface as the surface is rotated, causing a so-called sag problem. Therefore, for minimizing the variation in scanning line pitch, the effect of sag on the line pitch needs to be considered.

Moreover, there is an increasing demand for a smaller diameter of a light spot along with a request for high-density image recording to be achieved by an optical scanning apparatus. It is therefore required to properly correct curvature of field and spherical aberration of the lens. For correcting spherical aberration properly, an effective way is to reproduce "given designed distribution of refractive indices" inside a lens. However, it is difficult to realize the distribution of refractive indices as designed.

Distribution of refractive indices inside a lens occurring during the plastics molding process described above and distribution of refractive indices inside a lens which is defined as a design condition do not correspond precisely but are uncertain or variable to some extent. As a result, it is difficult to improve the yield of a scanning and image forming lens so as to have a high enough finished product quality to be put to practical use. Consequently, it is difficult to reduce the costs of a system of lenses for scanning and image formation and an overall cost of an optical scanning apparatus.

SUMMARY OF THE INVENTION

To overcome the problems with the plastics molding process and resulting non-uniform distribution of refractive indices described above, the preferred embodiments of the present invention provide an optical scanning and image forming lens which is constructed to minimize a beam spot diameter and to correct for errors in optical performance characteristics in a sub-scanning direction which are caused by a non-uniform refractive index of the lens resulting from a plastics molding lens forming process.

Furthermore, the preferred embodiments of the present invention provide an optical scanning lens which is adapted and constructed to make certain that a minimum beam spot diameter is within a certain tolerance of a desired range of size.

In addition, the preferred embodiments of the present invention provide an optical scanning and image forming lens having an expanded tolerance for uncertainty in the distribution of refractive indices while ensuring a proper diameter of a light spot even when the scanning and image forming lens or the lens included in a scanning and image forming lens system suffers from problems caused by a non-uniform distribution of refractive indices in the lens.

Preferred embodiments of the present invention also provide an optical scanning lens which is constructed to reduce variation in an image forming position caused by variation in the refractive index distribution of the lens.

In an optical scanning apparatus in accordance with a preferred embodiment of the present invention, a light beam emanating from a light source is converged to form a line image elongated in a direction corresponding to the main scanning direction (a direction in which main scanning is carried out on a light path from the light source to a surface to be scanned) via a first image formation optical system, deflected by a light deflector having a deflecting reflective surface located near an image forming position for the line image, and then converged as a light spot or beam spot on a surface to be scanned via a second image formation optical system for scanning the surface to be scanned.

According to a first aspect of a preferred embodiment of the present invention, the second image formation optical system includes a scanning and image forming lens that is a single anamorphic lens having a certain desired distribution of refractive indices in a direction corresponding to the sub-scanning direction (a direction in which sub-scanning is carried out on the light path from the light source to the surface to be scanned).

Assuming that a refractive index on the optical axis of the scanning and image forming lens is $n_0(0)$, a distribution of refractive indices is defined by an approximate expression of "$n(z)=n_0(0)+\Delta n(0) \times z^2$" in relation to a distance z from the optical axis in a direction of sub-scanning within a section in the sub-scanning direction. Assuming that the radii of curvature on the surfaces of the scanning and image forming lens facing the light deflector and the scanned surface, respectively within the section in the sub-scanning direction are $r_{S1}(0)$ and $r_{S2}(0)$, the thickness of the lens is d, a focal length in the sub-scanning direction calculated using the radii of curvature $r_{S1}(0)$ and $r_{S2}(0)$, the thickness d, and the refractive index $n_0(0)$ is f(0), a distance from the position of image formation for the line image to a front principal point in the sub-scanning direction of the scanning and image forming lens is $S_0(0)$, a distance from a rear principal point in the sub-scanning direction of the scanning and image forming lens to the scanned surface is $S_L(0)$, and tolerance for change of the diameter of a light spot in the sub-scanning direction is $\omega_0$, the following condition (1) is preferably satisfied:

$$|1/[\{1/f(0)\}-2\Delta n(0) \times d - \{1/S_0(0)\}]-S_L(0)| < \omega_0/2 \qquad (1)$$

The section in the sub-scanning direction is a plane including the optical axis of the single scanning and image forming lens and arranged parallel to the sub-scanning direction.

The tolerance for a change in the diameter of a light spot or beam spot in the direction of sub-scanning $\omega_0$ defines a range of defocusing which causes a variation ratio of the diameter in the direction of sub-scanning of each of a plurality of light spots generated during scanning to the diameter in the direction of sub-scanning of the waist of a beam spot, which is a minimum value of the diameter of the beam spot when the level of defocusing is varied, to become preferably about 10% or less. That is, the preferred embodiments of the present invention provide a scanning and image forming lens which is constructed to ensure that a minimum beam spot diameter is within a desired tolerance range and above a minimum tolerance level.

It should be noted that this tolerance is preferred to be approximately 10% but may be changed to other values according to certain applications for the inventive optical scanning and image forming lens.

When an upper limit defined by the condition (1) is exceeded, a deviation of the position of image formation of the light spot relative to the scanned surface in the direction of sub-scanning increases. In addition, the diameter of the light spot in the direction of sub-scanning becomes exceedingly large and much larger than a designed value.

According to a second aspect of preferred embodiments of the present invention, in the optical scanning apparatus according to the first aspect of the preferred embodiments of the present invention, assuming that a half width in the sub-scanning direction of a deflected light beam launching into the surface of the scanning and image forming lens facing the light deflector is Z, the values $\Delta n(0)$ and Z preferably satisfy the following condition (2):

$$0 < Z^2 \times \Delta n(0) \leq 1.1 \times 10^{-4} \qquad (2)$$

If the lens is designed according to condition (2), as seen in FIG. 11, a focus curve is flattened such that more of the curve and therefore more beam spot diameters are located within a desired range of tolerance while still being located above a minimum tolerance level. Thus, condition (2) effectively reduces the beam spot diameter while maintaining a value of an actual beam spot diameter above the minimum beam spot diameter level.

When the upper limit defined by condition (2) is exceeded, a spherical aberration in the direction of sub-scanning increases, and the diameter of a light spot in the direction of sub-scanning also increases.

When the lower limit defined by the condition (2) is exceeded, it becomes increasingly difficult to shorten the cooling time required for plastics molding and therefore, the time required for lens molding increases. This decreases efficiency of mass-production of the lens and makes it hard to minimize the manufacturing cost of the lens.

An optical scanning apparatus according to the third aspect of preferred embodiments of the present invention is characterized in that the second image formation optical system preferably is a system of lenses for scanning and image formation including two or more lenses, at least one lens includes a non-uniform distribution of refractive indices in the direction of sub-scanning, and a lens of the scanning and image forming lens system located closest to a surface to be scanned has a positive power in the direction of sub-scanning. As a result of this structure, although the refractive index distribution is non-uniform in the scanning and image forming lens system, a resulting deterioration of curvature of field is minimized. Further, even if the internal distribution of refractive indices is uncertain or not able to be accurately predicted or determined, the accompanying uncertainty in the curvature of field is prevented.

Further, assuming that the power of the lens in the direction of sub-scanning is $P_1$ for the lens opposed to the light deflector and the power of the lens opposed to the scanned surface is $P_2$, the following condition (3) is preferably satisfied:

$$P_2 > P_1 \quad (3)$$

When the condition (3) is satisfied, the advantage achieved according to the third aspect of the invention is greatly increased.

According to a fourth aspect of preferred embodiments of the present invention, of the two or more lenses constituting the lens system for scanning and image formation functioning as the second image formation optical system, the lens opposed to the scanned surface within the section of the sub-scanning direction preferably has a meniscus shape including a concave surface opposed to the light deflector.

According to a fifth aspect of preferred embodiments of the present invention, in the optical scanning apparatus, the lens system for scanning and image formation serving as the second image formation optical system is preferably composed of two lenses. When only the lens opposed to the light deflector includes the non-uniform distribution of refractive indices in the direction of sub-scanning as described above, assuming that a refractive index located on the optical axis of the lens opposed to the light deflector outside of the lens system for scanning and image formation is $n_0(0)$, the distribution of refractive indices inside the lens is reproduced by an approximate expression of $n(z)=n_0(0)+\Delta n(0) \times z^2$ in relation to a distance z from the optical axis in the direction of sub-scanning within a section in the sub-scanning direction (a plane including the optical axis of the lens opposed to the light deflector and lying parallel to the direction of sub-scanning). Assuming that the radii of curvature on the surfaces of the lens opposed to the light deflector and facing the light deflector and the scanned surface respectively in the section of sub-scanning direction of the lens are $r_{S1}(0)$ and $r_{S2}(0)$, the thickness of the lens is $d_1$, a focal length in the direction of sub-scanning calculated using the radii of curvature $r_{S1}(0)$ and $r_{S2}(0)$, the thickness $d_1$, and the refractive index $n_0(0)$ is $f_1(0)$, a distance from the position of image formation for a line image to a front principal point in the direction of sub-scanning of the lens opposed to the light deflector is $S_0(0)$, a distance from a rear principal point in the direction of sub-scanning of the lens to the front principal point of the lens opposed to the scanned surface is $S_1(0)$, a distance from the rear principal point in the direction of sub-scanning of the lens opposed to the scanned surface to the scanned surface is $S_L(0)$, a focal length of the lens opposed to the scanned surface in the direction of sub-scanning is $f_2(0)$, and the tolerance for change in the diameter of a light spot in the direction of sub-scanning is $\omega_0$, when the equality of $\Lambda=\{1/f_1(0)\}-2\Delta n(0) \times d_1 - \{1/S_0(0)\}$ is established, the following condition (4) is preferably satisfied:

$$|S_L(0)-1/[\{1/f_2(0)\}+\{\Lambda/(1-S_1(0)\times\Lambda)\}]|<\omega_0/2 \quad (4)$$

When the upper limit defined by the condition (4) is exceeded, a deviation of the position of image formation for a light spot in the sub-scanning direction relative to the scanned surface is increased, and the diameter in the direction of sub-scanning of the light spot is exceedingly increased and becomes much larger than a designed value.

According to the sixth aspect of preferred embodiments of the present invention, when the scanning and image forming lens system functioning as the second image formation optical system is composed of two lenses, and only one lens opposed to the light deflector includes the non-uniform distribution of refractive indices in the direction of sub-scanning as described above; assuming that a focal length of the lens opposed to the light deflector is $f_1(0)$, a distance from the position of image formation for the line image to a front principal point in the direction of sub-scanning of the lens opposed to the light deflector is $S_0(0)$, a distance from a rear principal point in the direction of sub-scanning of the lens opposed to the light deflector to a front principal point of the lens opposed to said scanned surface is $S_1(0)$, a distance from a rear principal point in the direction of sub-scanning of the lens opposed to the scanned surface to the scanned surface is $S_L(0)$, a refractive index on the optical axis of the lens opposed to the scanned surface $n_0'(0)$, the distribution of refractive indices inside the lens is reproduced by an approximate expression of $n'(z)=n_0'(0)+\Delta n'(0) \times z^2$ in relation to a distance z in the direction of sub-scanning from the optical axis within the section of sub-scanning, and assuming that the radii of curvature on the surfaces of the lens opposed to the scanned surface which face the deflector and scanned surface respectively, within the section of sub-scanning are $r_{S3}(0)$ and $r_{S4}(0)$ respectively, the thickness of the lens is $d_3$, a focal length in the direction of sub-scanning calculated using the radii of curvature $r_{S3}(0)$ and $r_{S4}(0)$, the thickness $d_3$, and the refractive index $n_0'(0)$ is $f_2(0)$, and the tolerance for change of the diameter of a light spot in the direction of sub-scanning is $\omega_0$, when the equality of $\Lambda'=\{1/f_1(0)\}-\{1/S_0(0)\}$ is established, it is desirable that the following condition (5) is satisfied:

$$|S_L(0)-1/[\{1/f_2(0)\}+\{\Lambda'/(1-S_1(0)\times\Lambda')\}-2\Delta n'(0)\times d_3]|<\omega 0/2 \quad (5)$$

When the upper limit defined in the condition (5) is exceeded, a deviation of the image forming position of a light spot from the surface of the scanned surface in the sub-scanning direction greatly increases and consequently, the diameter of the light spot in the sub-scanning direction becomes remarkably larger than the designed value.

According to a seventh aspect of preferred embodiments of the present invention, when the scanning and image forming lens system functioning as the second image formation optical system is composed of two lenses, and these two lens include a non-uniform distribution of refractive indices in the direction of sub-scanning as described above; assuming that a refractive index on the optical axis of the lens opposed to the light deflector outside of the scanning and image forming lens system is $n_0(0)$, the distribution of refractive indices inside the lens is reproduced by an approximate expression of $n(z)=n_0(0)+\Delta n(0) \times z^2$ in relation to a distance z in the direction of sub-scanning from the optical axis within the section of sub-scanning, and assuming that the radii of curvature on the surfaces of the lens opposed to the scanned surface which face the deflector and scanned surface respectively, within the section of sub-scanning are $r_{S1}(0)$ and $r_{S2}(0)$ respectively, the thickness of the lens is $d_1$, a focal length in the direction of sub-scanning calculated using the radii of curvature $r_{S1}(0)$ and $r_{S2}(0)$, the thickness $d_1$, and the refractive index $n_0(0)$ is $f_1(0)$, a refractive index on the optical axis of said lens opposed to the scanned surface $n_0'(0)$, the distribution of refractive indices inside the lens is reproduced by an approximate expression of $n'(z)=n_0'(0)+\Delta n'(0) \times z^2$ in relation to a distance z in the direction of sub-scanning from the optical axis within the section of sub-scanning, and assuming that the radii of curvature on the surfaces of the lens opposed to the light deflector which face the deflector and scanned surface respectively, within the section of sub-scanning are $r_{S3}(0)$ and $r_{S4}(0)$ respectively, the thickness of said lens is $d_3$, a focal length in the direction of sub-scanning calculated using the radii of curvature $r_{S3}(0)$ and $r_{S4}(0)$, the thickness $d_3$, and the refractive index $n_0'(0)$ is $f_2(0)$, a distance from the position of image formation for the line image to a front principal point in the direction of sub-scanning of the lens opposed to the light deflector is $S_0(0)$, a distance from a rear principal point in the direction of sub-scanning of the lens opposed to the light deflector to a front principal point of the lens opposed to the scanned surface is $S_1(0)$, a distance from a rear principal point in the direction of sub-scanning of the lens opposed to the scanned surface to the scanned surface is $S_L(0)$, and the tolerance for change of the diameter of a light spot in the direction of sub-scanning is $\omega_0$, when the equality of $\Lambda=\{1/f_1(0)\}-2\Delta n(0) \times d_1-\{1/S_0(0)\}$ is established, it is desirable that the following condition (6) is satisfied:

$$|S_L(0)-1/[\{1/f_2(0)\}+\{\Lambda/(1-S_1(0)\times\Lambda)\}-2\Delta n'(0)\times d_3]|<\omega_0/2 \quad (6)$$

When the upper limit defined by the condition (6) is exceeded, a deviation of the image forming position of a light spot from the surface of the scanned surface in the sub-scanning direction greatly increases. Consequently, the diameter of the light spot in the sub-scanning direction becomes remarkably larger than the designed value.

According to another preferred embodiment of the present invention, an optical scanning and imaging lens for use in an optical scanning and imaging apparatus is specifically designed and constructed to greatly reduce scanning line pitch variation by taking into consideration the non-uniformity of a refractive index distribution of the lens. Thus, this preferred embodiment of a scanning imaging system has a gradient-index lens having a non-uniform refractive index distribution in a sub-scanning direction which is considered and compensated for in order to minimize scanning line pitch variation which is caused by a surface inclination of a polygon mirror used as a deflector.

Assume that a power variation in the sub-scanning direction of the scanning imaging system caused by the above-mentioned non-uniform refractive index distribution is $\Delta P$, and that the image position in the sub-scanning direction by the scanning imaging system of the deflected beam when the gradient-index lens is assumed to have a uniform refractive index $N_0$ is Q (which is measured from the position on the scanning surface, the polygon mirror side being negative).

These values of $\Delta P$ and Q vary in accordance with the deflection angle of the deflected beam. The value at the optical axis of the scanning imaging system will be expressed by the suffix C, and the value at the most remote optical path of the effective scanning region (the region where image writing by optical scanning is effected) will be expressed by the suffix E. Other values will be expressed in a similar manner.

In accordance with the an eighth aspect of preferred embodiments of the present invention, an optical scanning and image forming lens is constructed such that, $\Delta P_C$ and $Q_C$, which are $\Delta P$ and Q at the optical axis, and $\Delta P_E$ and $Q_E$, which are $\Delta P$ and Q at the most remote optical path, preferably satisfy the following condition:

$$Q_E>0>Q_C \quad (7)$$

For reasons explained below, it is also preferred if the optical scanning and image forming lens is constructed to satisfy the condition:

$$|\Delta P_C|>|\Delta P_E| \quad (8)$$

When the scanning imaging system has a gradient-index lens, the following two cases are possible: the case in which the gradient-index lens is included as part of the scanning imaging system, and the case in which the scanning imaging system is constituted of the gradient-index lens.

The scanning imaging system is further characterized in that, in accordance with a ninth aspect of preferred embodiments of the present invention, when the refractive index distribution in the gradient-index lens is taken into consideration, the value $Q_C'$ at the optical axis of the image forming position Q' of the deflected beam in the sub-scanning direction by the scanning imaging system (which is measured from the position on the scanning surface, the polygon mirror side being negative) and the value $Q_E'$ at the most remote optical path of the effective scanning region preferably satisfy the following condition:

$$Q_E'>Q_C' \quad (9)$$

The scanning imaging system according to the eighth aspect of the invention is further characterized in that, in accordance with a tenth aspect of preferred embodiments of the present invention, in which a value $S_C'$ at the optical axis of the distance S' from the rear principal point in the sub-scanning direction of the scanning imaging system to the image forming point in the sub-scanning direction and a value $S_E'$ at the most remote optical path of the effective scanning region preferably satisfy the following condition:

$$Q_E-S_E'^2 \cdot \Delta P_E>Q_C-S_C'^2 \cdot \Delta P_C \quad (10)$$

The scanning imaging system according to the ninth or tenth aspect of preferred embodiments of the present invention is further characterized in that, in accordance with an eleventh aspect of preferred embodiments of the present invention, $\Delta P_E$, $Q_E$, $Q_E'$ and $S_E'$ are values at the most remote optical path on the side on which the sag is larger.

The scanning imaging system according to the ninth or tenth aspect of preferred embodiments of the present invention is further characterized in that, in accordance with the twelfth aspect of preferred embodiments of the present invention, $\Delta P_E$, $Q_E$, $Q_E'$ and $S_E'$ are values at the most remote optical path on the side on which the distance by which the deflected beam is transmitted through the gradient-index lens is longer.

According to the thirteenth aspect of preferred embodiments of the present invention, the scanning imaging system according to any one of the eighth to twelfth aspects of preferred embodiments of the present invention may comprise a single gradient-index lens, with the main scanning cross-sectional configuration being biconvex.

The main scanning cross sectional configuration is preferably a sectional configuration taken along a plane including the optical axis of the gradient-index lens and being arranged parallel to the main scanning direction.

Assuming that the values of the above ΔP, Q, Q', S' for the image height h of the light spot (an arbitrary image height between the optical axis and the most remote optical path) is $\Delta P_h$, $Q_h$, $Q_h'$, $S_h'$, it is more preferable that the above conditions (7), (9) and (10) satisfy the following:

$$Q_E > Q_h > Q_C, 0 > Q_C \qquad (7')$$

$$Q_E' > Q_h' > Q_c' \qquad (9')$$

$$Q_E - S_E^2 \cdot \Delta P_E > Q_h - S_h'^2 \cdot \Delta P_h > Q_C - S_C \Delta P_C \qquad (10')$$

The gradient-index lens included in or forming the scanning imaging system of certain preferred embodiments of this invention may be formed by plastics molding as described above. Since the plastics molding is conducted under the same conditions using the same material, there is substantially no difference between the gradient-index lenses formed by the plastics molding in terms of the resulting non-uniform refractive index distribution. Since the non-uniform refractive index distribution can be determined by experiment or the like, it is possible to design a gradient-index lens to be manufactured while considering the refractive index distribution during such design.

According to further preferred embodiments of the present invention, an optical scanning lens is constructed to suppress variation in a diameter of a light spot according to an image height, which variation is caused by non-uniformity of the refractive index in the lens. According to a specific preferred embodiment of the present invention, an optical scanning lens converges a light flux deflected by a light deflector as a light spot in the vicinity of a surface to be scanned. The lens is formed via the plastics molding process described above and has a tolerance for a change of the diameter of a light spot that suppresses variation in the diameter of the light spot according to an image height, which is caused by non-uniformity of the refractive index in the lens. This preferred embodiment preferably provides an optical scanning lens which minimizes beam spot diameter for all points along a scanning direction, including in a scanning direction and in a sub-scanning direction, by flattening out a focus curve such that each beam spot diameter according to an image height is minimized.

When an area having $1/e^2$ intensity in a light spot at a zero image height position is defined as a criterion or minimum diameter for a light spot, the tolerance for change in the diameter of a light spot is defined such that a ratio of change in the diameter of a light spot within an allowable range for practical use, such as, for example, is ±10% of the minimum diameter, over the effective scanning area of the lens.

According to further preferred embodiments of the present invention, if a focal distance of the lens is denoted by f, an amount of variation (a difference between a maximum value and a minimum value within an area of a radius of about 1 mm from a principal ray of the deflected light flux) in the refractive index in the sub-scanning direction, which is substantially perpendicular to the optical axis of the lens, is denoted by $\Delta n_r$, a distance from a front principal point to an object point of the lens is denoted by S, a maximum thickness of the lens in the effective scanning area of the lens is denoted by t, the tolerance for change in the diameter of a light spot is denoted by $\omega_0$, then f, n, S, t and $\omega_0$ satisfy, over the effective scanning area of the lens, a condition:

$$\omega_0/(2t) \leq |\{(S \times f)/(S-f)\}^2 \times \Delta n_r|(13) \qquad (11)$$

FIG. 26 is a diagram explaining an amount of variation in the refractive index ($\Delta n_r$). In FIG. 26, a vertical axis denotes a refractive index n and a horizontal axis denotes a distance from the principal ray of the deflected light flux in the sub-scanning direction. A solid line denoted by 26-1 represents distribution of refractive indices, which is constant throughout the lens.

When the principal ray of the deflected light flux coincides with the vertical axis of FIG. 26, the amount of variation in the refractive index ($\Delta n_r$) in this case is represented by a difference between a maximum value and a minimum value of the refractive index in a range defined by a position −1.0 mm and a position 1.00 mm from the vertical axis. If the position of the principal ray of the deflected light flux changes relative to the scanning lens, then the position of the vertical axis changes relative to the refractive index distribution 26-1 and accordingly, the amount of variation in the refractive index ($\Delta n_r$) changes.

The optical scanning lens according to preferred embodiments of the present invention may be an anamorphic lens having different powers in a direction corresponding to the main scanning direction and in a direction corresponding to the sub-scanning direction. The lens is preferably configured to establish an approximate conjugate relationship between a deflecting starting point of a light deflector and a surface to be scanned with respect to the direction corresponding to the sub-scanning direction. When the optical scanning lens is configured to be such an anamorphic lens, if the focal distance of the lens (f), the distance from the front principal point to the object point of the lens (S), the tolerance for change in the diameter of a light spot ($\omega_0$), the amount of variation in the refractive index of the lens ($\Delta n_r$) are respectively denoted by $f_m$, $S_m$, $\omega_m$, $\Delta n_{rm}$ with respect to the direction corresponding to the main scanning direction and by $f_s$, $S_s$, $\omega_s$, $\Delta n_{rs}$, with respect to the direction corresponding to the sub-scanning direction, then these factors satisfy, over the effective scanning area of the lens, conditions:

$$\omega_m/(2t) \geq |\{(S_m \times f_m)/(S_m-f_m)\}^2 \Delta n_{rm}| \qquad (11\text{-m})$$

$$\omega_s/(2t) \geq |\{(S_s \times f_s)/(S_s-f_s)\}^2 \Delta n_{rs}| \qquad (11\text{-s})$$

FIG. 27 is a diagram explaining an effect of variation in the refractive index on a focal distance and an image forming position of a scanning lens. In FIG. 27, the front principal point position E of the lens L, the rear principal position F, the object point P, the imaging point Q, the focal distance f, the object distance S (distance between the object point P and the front principal point E), and the image distance S' (distance between the rear principal point F and the imaging point Q) are defined with the assumption that the refractive index of the lens L is uniform throughout the entire lens L and are determined based upon a radius of curvature of surfaces of the lens, the thickness of the lens and the refractive index of the material of the lens, and S, S' and f satisfy a relationship: $(1/S)+(1/S')=1/f$. In this condition, if the lens L has the variation in the refractive index as indicated by 26-1 in FIG. 26, then the focal distance f changes by a distance Δf due to the variation in the refractive index of the lens L. This distance Δf causes a change in the imaging point Q by a distance $\Delta S'$ from the imaging point Q. The distance $\Delta S'$ is approximately expressed by an equation:

$$\Delta S' = \{S/(S-f)\}^2 \times \Delta f \quad (12)$$

Because variation in the refractive index of the lens has the same function as a lens, if the variation in the refractive index is considered as an equivalent lens and a focal distance of the lens is denoted by f', then the focal distance of the lens L having variation in the refractive index becomes a focal distance of a composite lens of the lens L having the focal distance f and the lens having the focal distance f', and the distance f is approximately expressed by an equation:

$$\Delta f \approx -f^2/f' \quad (13)$$

Distribution of refractive indices of a lens is expressed in various ways. If the coordinate in a direction which is perpendicular to the optical axis of the lens is denoted by r, the coordinate in the direction of the optical axis is denoted by Z, considering that distribution of refractive indices is symmetrical relative to the center of the lens as illustrated in FIGS. 25(a)–25(e), the refractive index distribution n(r, z) may be expressed by an equation:

$$n(r,Z) = n_0 + ar^2 + br^4 + cr^6 + \ldots + AZ^2 + BZ^4 + CZ^6 + \ldots ,$$

wherein a, b, c, . . . , A, B, C, . . . are a constant coefficient and $n_0$ represents the refractive index at the center of the lens on the optical axis.

Because the elements of the equation raised above the $4^{th}$ power can be neglected in the actual refractive index distribution in a practical design, the refractive index distribution n(r, Z) may be expressed by an equation:

$$n(r,Z) = n_0 + ar^2 + AZ^2 \quad (14)$$

The refractive index distribution in the sub-scanning direction (the direction orthogonal to the optical axis) is expressed by an equation:

$$n(r) = n_0 + ar^2 \quad (14')$$

The refractive index distribution in the main scanning direction (the direction parallel to the optical axis) is expressed by an equation:

$$n(Z) = n_0 + AZ^2 \quad (14'')$$

The above described focal distance f' is approximately expressed, using the maximum thickness of the lens t, by an equation:

$$f' \approx 1/(2at) \quad (15\text{-}1)$$

The amount of variation in the refractive index $\Delta n_r$ is equivalent to the coefficient: a, according to the definition of the amount of variation in the refractive index $\Delta n_r$. Accordingly, the equation 15-1 is expressed by an equation:

$$f' \approx 1/(2 \times n_r \times t) \quad (15\text{-}2)$$

When the lens has variation in the refractive index in the sub-scanning direction as expressed by the equation (14'), then the equation (13) is expressed by an equation:

$$f \approx f^2(2 \times \Delta n_r \times t) \quad (13')$$

If the right member of the equation (12) is replaced with the right member of the equation (13'), then the distance $\Delta S'$ is expressed by an equation:

$$\Delta S' = \{S/(S-f)\}^2 \times f^2 \times (2\Delta n_r \times t) = \{(S \times f)/(S-f)\}^2 \times 2\Delta n_r \times t \quad (12')$$

Because the tolerance for change in the diameter of a light spot $\omega_0$ is such that it suppresses variation in the diameter of a light spot within the range of about $\pm 10\%$ of the minimum diameter of the light spot, the tolerance for change in the diameter of a light spot $\omega_0$ needs to satisfy, throughout the effective scanning area of the lens, a condition:

$$\omega_0 \geq |\Delta S'| \quad (16)$$

Because t>0, even when the lens has variation in the refractive index as expressed by the equation: $n(r) = n_0 + ar^2$, variation in the diameter of a light spot according to an image height is suppressed within the area of the range of about $\pm 10\%$ of the minimum diameter of the light spot, if the lens satisfies a condition:

$$\omega_0/(2t) \geq |\{(S \times f)/(S-f)\}^2 \times \Delta n_r| \quad (11)$$

Because variation in the refractive index $\Delta n_z$ in the direction parallel with the optical axis of the lens rarely affects the focal distance $\Delta f$, a change in the imaging position $\Delta S'$ does not occur. However, when the surface of the lens having curvature includes a large variation in the refractive index $\Delta n_z$, in the direction parallel to the optical axis, wave-front aberration deteriorates and the diameter of a beam spot may vary due to variation in the refractive index. Therefore, when the variation in the refractive indexes $\Delta n$. is relatively large, considering such change in the diameter of the beam spot due to deterioration of wave-front aberration, it is desirable that the lens has a sufficient tolerance for change in the diameter of a light spot so that variation in the diameter of the light spot is kept within an allowable range for practical use.

In the above description, it is assumed that variation in the refractive index in the sub-scanning direction in a scanning lens occurs symmetrically with respect to the optical axis. However, an optical scanning lens is generally formed in a shape having a minimum required width in a direction corresponding to the sub-scanning direction. In such a case, variation in the refractive index in the main scanning direction is not the same as that in the sub-scanning direction. The refractive index in the sub-scanning direction generally changes abruptly as illustrated in FIG. 25(e).

In this case, because variation in the refractive index in the main scanning direction ($\Delta n_{rm}$) and variation in the refractive index in the sub-scanning direction ($\Delta n_{rs}$) are different, the lens may preferably be configured so that the tolerance for change in the diameter of a light spot $\omega_m$ in the main scanning direction and the tolerance for change in the diameter of a light spot $\omega_s$ in the sub-scanning direction satisfy conditions;

$$\omega_m/(2t) \geq |\{(S \times f)/(S-f)\}^2 \times \Delta n_{rm}| \quad (11\text{-m}')$$

$$\omega_s/(2t) \geq |\{(S \times f)/(S-f)\}^2 \times \Delta n_{rs}| \quad (11\text{-s}')$$

Further, when the lens is an anamorphic lens having different powers in a direction corresponding to the main scanning direction and in a direction corresponding to the sub-scanning direction and the lens establishes an approximate conjugate relationship between a deflecting starting point of a light deflector and a surface to be scanned with respect to the direction corresponding to the sub-scanning direction, because the object distance S, the imaging distance S' and the focal distance f are different in the main scanning direction and in the sub-scanning direction, variation in the diameter of a light spot can be kept within a desired range of about ±10% of the criterion diameter of the light spot over the effective scanning area of the lens, if the lens satisfies the above conditions (11-m) and (11-s).

When the lens is formed to have a shape including a shorter width in a direction corresponding to the sub-scanning direction as described above, the lens generally satisfies a condition:

$$|\Delta n_{rm}| < |\Delta n_{rs}|$$

and accordingly, the tolerance for change in the diameter of a light spot $\omega_m$ in the main scanning direction and the tolerance for change in the diameter of a light spot $\omega_s$ in the sub-scanning direction preferably satisfy a condition:

$$\omega_m < \omega_s$$

As described above, variation in the diameter of a light spot on a surface to be scanned according to an image height is caused by curvature of field in the main and the sub-scanning directions which is determined by a design criteria for a lens and by variation in the refractive index of the lens. Therefore, in order to achieve a desired tolerance for change in the diameter of a light spot $\omega_0$, it is desirable that curvature of field is minimized both for the main scanning direction and the sub-scanning direction.

Further, because change in lateral magnification of the lens according to an image height also causes change in the diameter of a light spot, it is desirable that change in the lateral magnification is minimized.

Furthermore, because distribution of refractive indices in a lens can be estimated to a certain extent via simulation and experiment, it is desirable that correction of curvature of field is made based upon and in consideration an effect of such estimated non-uniform distribution of refractive indices of the lens.

Other features, advantages and achievements of preferred embodiments of the present invention will become more apparent and described in more detail in the following detailed description of preferred embodiments which are illustrated in the drawing figures.

BRIEF DESCRIPTION OF THE DRAWINGS

FIG. 1(d) is a diagram illustrating a refractive index distribution curve for an optical scanning lens according to a preferred embodiment of the present invention;

FIG. 2 is a diagram illustrating an optical scanning lens according to a preferred embodiment of the present invention for explaining a desired condition of the preferred embodiment of the present invention shown in FIGS. 1(a)–1(e);

FIG. 3(a) is a diagram showing a curvature of field in a direction of main scanning of an optical scanning lens according to first to third preferred embodiments and comparable examples 1 to 3;

FIG. 3(b) is a diagram showing distortion in a direction of main scanning of an optical scanning lens according to first to third preferred embodiments and comparable examples 1 to 3;

DETAILED DESCRIPTION OF PREFERRED EMBODIMENTS

Specific preferred embodiments of the present invention will now be described below.

Figure 1A:
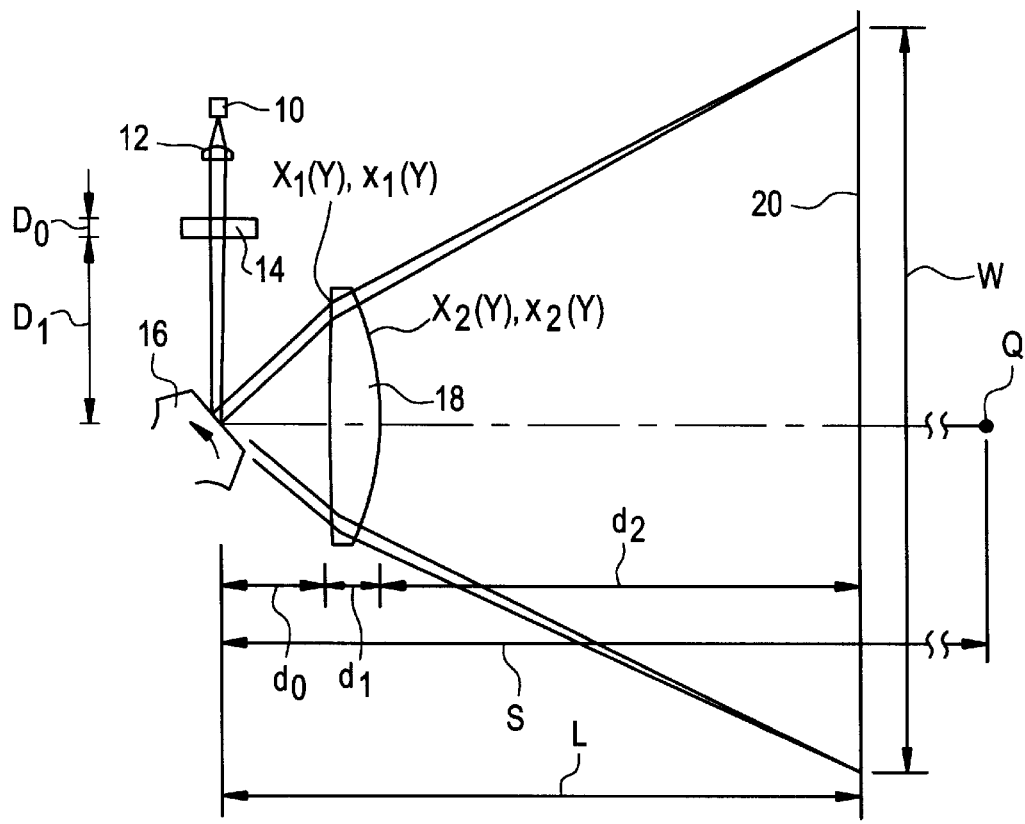
FIG. 1(a) is a diagram of an optical scanning apparatus according to a preferred embodiment of the present invention.

Referring to FIG. 1(a) illustrating an example of an optical scanning apparatus according to the first aspect of preferred embodiments of the present invention, a diverging light beam radiated from a light-emitting source 10, such as a semiconductor laser, is coupled to a subsequent optical system by a coupling lens 12 forming a light source in cooperation with the light-emitting source 10.

A light beam emanating from the light source 10 is converged in a direction of sub-scanning (a direction perpendicular to the plane of the FIG. 1(a) by a cylindrical lens 14 serving as a first image formation optical system. The converged light beam forms a line image elongated in a direction of main scanning at a location near a deflecting reflective surface of a polygon mirror 16 serving as a light deflector, and is deflected at an equiangular speed during rotation of the polygon mirror 16.

The deflected light beam is transmitted onto a single optical scanning lens 18 serving as a second image formation optical system, and is converged on a scanned photoconductive surface 20 in the form of a light spot as a result of the operation of the optical scanning lens 18. The scanned surface 20 is then scanned optically in the direction of main scanning (vertical direction in FIG. 1(a). A distance W in FIG. 1(a) indicates an effective width for main scanning.

In the preferred embodiment illustrated in FIGS. 1(a) to 1(d), there is provided an optical scanning apparatus in which a light beam emanating from the light source 10 and 12 is converged to form a line image elongated in the direction of main scanning via the first image formation optical system 14, deflected via the light deflector 16 having a deflecting reflective surface located near an image formation position for the line image, and converged on the scanned surface 20 in the form of a light spot via the second image formation optical system 18 for optically scanning the surface 20.

The second image formation optical system preferably includes a scanning and image forming lens 18 that is preferably a single anamorphic lens. A concave cylindrical mirror serving as the first image formation optical system may be substituted for the cylindrical lens 14, if desired.

The coupling lens 12 is an optical element for coupling a light beam emanating from the light-emitting source to an optical system including the cylindrical lens and subsequent lenses, and is capable of transforming the light beam emanating from the light-emitting source 10 into a parallel beam or weak converging beam or weak diverging beam.

In the preferred embodiment illustrated in FIG. 1(a), the coupling lens 12 has the ability to transform a light beam emanating from the light-emitting source 10 into a weak converging beam. As far as the direction of main scanning is concerned, unless the optical scanning lens 18 is provided, the light beam deflected at an angle of deflection of 0 would be converged at a point of natural convergence Q. The natural convergence point Q is a position on a virtual optical path defined by linearly developing an optical path from a light source to a scanned surface along an optical axis on which, unless an optical system for forming the line image and an optical scanning lens are provided along the optical path, the light beam coupled by the coupling lens is naturally converged.

A distance from the start point of deflection caused by the deflecting reflective surface of the mirror 16 to the point of natural convergence Q is, as illustrated, denoted by S. When the point of natural convergence Q is located close to the scanned surface beyond the light deflector, S>0 is established. At this time, the coupled light beam is weakly convergent. Moreover, when the point of natural convergence Q is located close to the light source beyond the light deflector, S<0 is established. At this time, the coupled light beam is weakly divergent. When the coupled light beam is a parallel beam, S=∞ is established.

FIG. 2 illustrates the shape of the optical scanning lens 18, according to preferred embodiments of the present invention, in a section in the sub-scanning direction. As illustrated, the optical scanning lens 18 within the section of sub-scanning direction preferably has a meniscus shape having a concave surface opposed to the deflecting reflective surface (left-hand side in FIG. 2). The front principal point H and the rear principal point H' in the direction of sub-scanning are located on the side of the scanned surface (right-hand side in FIG. 2) beyond the lens body. The power in the direction of sub-scanning provided by the optical scanning lens 18 is therefore lower than the power in the direction of sub-scanning attained at the actual position of the optical scanning lens 18. Consequently, the influence of an error of the position of the optical scanning lens 18 upon the performance of image formation can be reduced.

Point A in FIG. 2 indicates the position of image formation of a line image, and point B indicates a point of image formation of the line image formed by the optical scanning lens 18. Assuming that a distance between the point A and the front principal point H is $S_0(0)$ and a distance between the rear principal point H' and the point B is $S_L(0)$, the expression $|\beta(0)|$ is rewritten as $S_0'(0)/S_0(0)$, wherein $S_0'(0) = 1/[1/f(0) - 2\Delta n(0) \cdot d - \{1/S_0(0)\}]$.

Assuming that the refractive index on the optical axis of the scanning and image forming lens 18 is $n_0(0)$, the distribution of refractive indices can be defined by an approximate expression of $n(z) = n_0(0) + \Delta n(0) \times z^2$ in relation to a distance z in the direction of sub-scanning from the optical axis within the section of sub-scanning direction, as is illustrated in FIG. 1(d). The expression $\Delta n(0)$ indicates a constant, the value of which is equal to a refractive index per unit distance relative to the optical axis, wherein the value is taken at a single point along the refractive index distribution curve. The distribution of refractive indices is preferably symmetrical with respect to the optical axis as seen in FIG. 1(d).

Assuming that the radii of curvature of the surfaces of the scanning and image formation lens 18 facing the light deflector and the scanned surface, respectively, within the section of sub-scanning are $r_{S1}(0)$ and $r_{S2}(0)$, respectively, the thickness of the lens is d, and a focal length in the direction of sub-scanning calculated using the radii of curvature $r_{S1}(0)$ and $r_{S2}(0)$, the thickness d, and the refractive index $n_0(0)$ is f(0), when the distribution of refractive indices $n(z) = n_0(0) + \Delta n(0) \times z^2$ is converted into the action of a lens, the action is comparable to the action of a lens specified with a focal length of $\Delta f = -1/\{2\Delta n(0) \times d\}$. When $\Delta n(0)>0$ is established, the action is equivalent to the action of a negative lens. When $\Delta n(0)<0$ is established, the action is equivalent to the action of a positive lens.

Accordingly, a focal length from a composite system of lenses including the scanning and image forming lens 18, which does not include distribution of refractive indices and is specified with a focal length f(0) and a lens specified with a focal length $\Delta f$ is defined as $1/[\{1/f(0)\}+(1/\Delta f)]$. A change in focal length caused by the distribution of refractive indices results in a change in the point of image formation. Assuming that a distance from the rear principal point H' to the point of image formation when the distribution of refractive indices is recognized is S', the following expression of relation is established:

$$(1/S')+\{1/S_0(0)\}=\{1/f(0)\}+(1/\Delta f)$$

When $\Delta f=-1/\{2\Delta n(0)\times d\}$ is assigned to this expression of relation, the following expression is obtained:

$$S'=1/[\{1/f(0)\}-1/\{2\Delta n(0)\times d\}-\{1/S_0(0)\}]$$

In this case, the position of image formation for a light spot in the direction of sub-scanning is deviated from the designed position of image formation $S_L(0)$ by a deviation $S'-S_L(0)$.

The tolerance for change of the diameter of a light spot in the direction of sub-scanning, $\omega_0$, is defined as a width of defocusing causing the ratio of the diameter of a light spot in the direction of sub-scanning to the diameter of the waist of a beam in the direction of sub-scanning (a minimum value of the diameter of a light spot in the direction of sub-scanning attained by changing the level of defocusing).

In the preferred embodiments of the present invention, the tolerance is preferably about ±10% or less, which tolerance indicates an allowable range of values of the diameter of a light spot in the direction of sub-scanning. The allowable range in the diameter of a light spot preferably extends in both directions from the waist of a beam. Therefore, in order to achieve this desired tolerance in practice, the absolute value of the deviation of the position of image formation is preferably smaller than about $\omega_0/2$.

Thus, for causing the diameter of a light spot in the direction of sub-scanning to fall within the tolerance of about ±10% for the diameter of a light spot, the condition (1) is preferably satisfied:

$$|1/[\{1/f(0)\}-2\Delta n(0)\times d-\{1/S_0(0)\}]-S_L(0)|<\omega_0/2 \quad (1)$$

In addition, it is preferred if the apparatus and lens 18 shown in FIG. 1(a) is constructed according to the second aspect of preferred embodiments of the present invention. More specifically, assuming that a half width in the sub-scanning direction of a deflected light beam launching into the surface of the scanning and image forming lens facing the light deflector is Z, the values $\Delta n(0)$ and Z preferably satisfy the following condition (2):

$$0<Z^2\times\Delta n(0)\leq 1.1\times 10^{-4} \quad (2)$$

Figure 14:
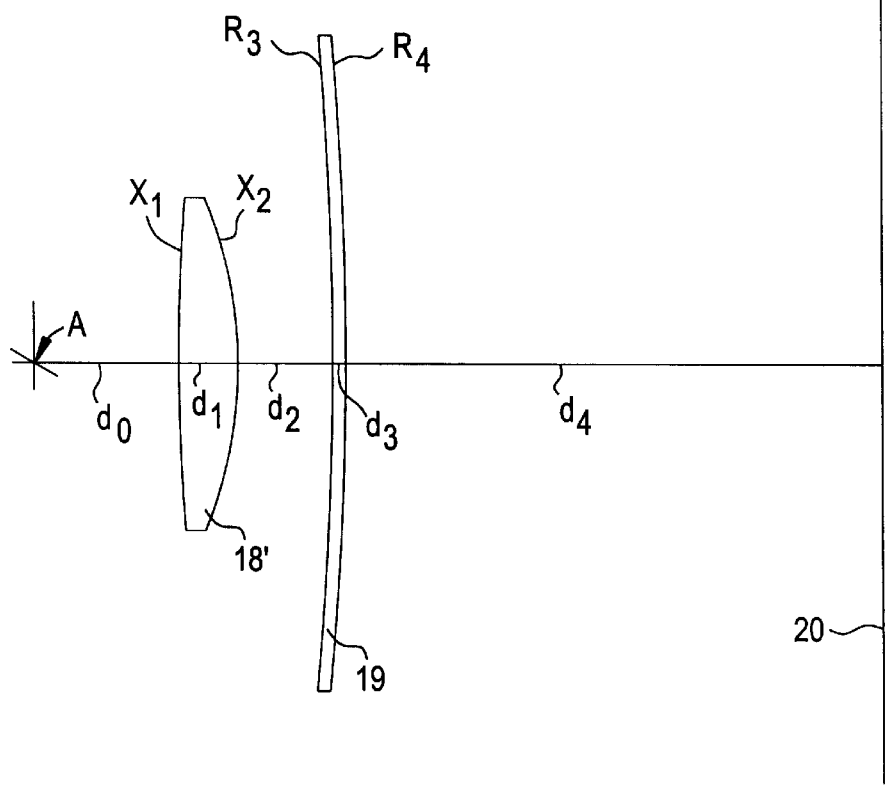
FIG. 14 is a diagram illustrating another preferred embodiment of the present invention.
Figure 15:
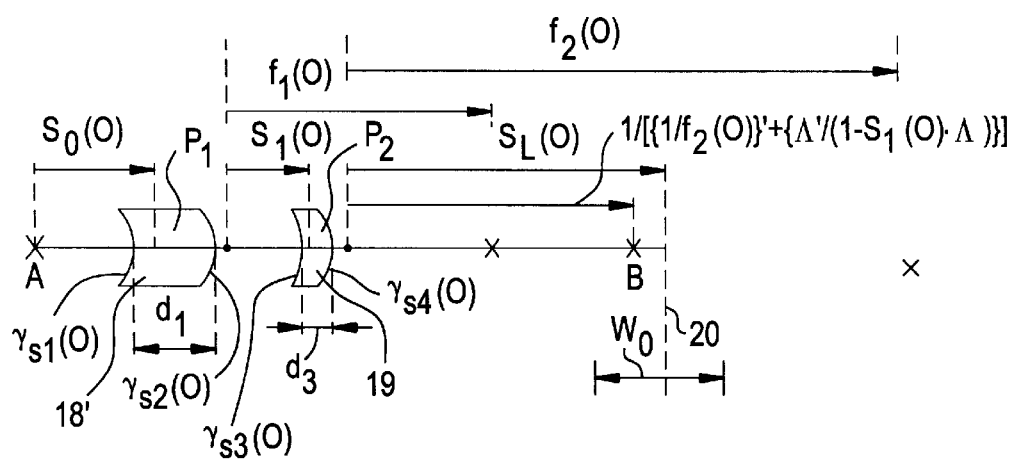
FIG. 15 is a diagram illustrating first and second optical scanning lenses according to a preferred embodiment of the present invention for explaining a desired condition of the preferred embodiment of the present invention shown in FIG. 14.

FIG. 14 schematically illustrates only a portion needed to describe a preferred embodiment of the present invention according to the third to fifth aspects of preferred embodiments of the present invention. FIG. 15 illustrates the shape of the optical scanning lens 18' and lens 19, according to preferred embodiments of the present invention, in a section in the sub-scanning direction. FIG. 15 and the reference numerals contained therein relating to the apparatus shown in FIG. 14 substantially corresponds to FIG. 2 relating to the apparatus shown in FIG. 1(a).

The arrangement of optical elements including a light source and light deflector of the apparatus of FIG. 14 is preferably identical to the one shown in FIG. 1(a). Reference numeral A denotes a position of image formation for a line image.

In the preferred embodiment shown in FIGS. 14 and 15, a light beam emanating from the light source is converged to form a line image elongated in a direction of main scanning via a first image formation optical system that is not shown, and is deflected via a light deflector having a deflecting reflective surface in the vicinity of the position of image formation A for the line image. The deflected light beam is converged as a light spot on a scanned surface 20 via a second image formation optical system for optically scanning the surface to be scanned.

The second image formation optical system is preferably a system of lenses for scanning and image formation preferably including two or more lenses 18' and 19. At least one of the lenses 18', 19 includes a non-uniform distribution of refractive indices in the direction of sub-scanning. The lens 19 located closest to the scanned surface of the scanning and image forming lens system provides positive power in a direction of sub-scanning. In this preferred embodiment, the system of lenses for scanning and image formation of the second image formation optical system is preferably composed of two lenses 18' and 19, but may include more than two lenses. Assuming that the power in the direction of sub-scanning of the lens 18' opposed to the light deflector is $P_1$, and the power of the lens 19 opposed to the scanned surface 20 is $P_2$, the relationship of "$P_2 > P_1$" is preferably established.

Out of the two lenses 18' and 19 constituting the scanning and image forming lens system that is the second image formation optical system, the lens 19 opposed to the scanned surface 20 preferably has a meniscus shape including a concave surface opposed to the light deflector within a section of the sub-scanning direction.

Furthermore, out of the two lenses 18' and 19 constituting the second image formation optical system, only the lens 18' opposed to the light deflector includes the non-uniform distribution of refractive indices in the direction of sub-scanning defined as described below. Assuming that the refractive index on the optical axis of the lens 18' is $n_0(0)$, the distribution of refractive indices inside the lens is reproduced in relation to a distance z in the direction of sub-scanning from the optical axis within the section of sub-scanning direction by an approximate expression $n(Z) = n_0(0) + \Delta n(0) \times z^2$.

Assuming that the radii of curvature on the surfaces of the lens 18' opposed to the light deflector, which face the light deflector and the scanned surface, respectively, within the section of sub-scanning direction are $r_{S1}(0)$ and $r_{S2}(^0)$, respectively, the thickness of the lens is $d_1$, a focal length in the direction of sub-scanning calculated using the radii of curvature $r_{S1}(0)$ and $r_{S2}(0)$, the thickness $d_1$, and the refractive index $n_0(0)$ is $f_1(0)$, a distance from the position of image formation for a line image A to the front principal point in the direction of sub-scanning of the lens 18' opposed to the light deflector is $S_0(0)$, a distance in the direction of sub-scanning from the rear principal point of the lens 18' to the front principal point of the lens opposed to the scanned surface is $S_1(0)$, a distance from the rear principal point in the direction of sub-scanning of the lens 19 opposed to the scanned surface to the scanned surface is $S_L(0)$, a focal length in the direction of sub-scanning from the lens 19 is $f_2(0)$, and the tolerance for change of the diameter of a light spot in the direction of sub-scanning is $\omega_0$, the equality of $\Lambda = \{1/f_1(0)\} - 2\Delta n(0) \times d_1 - \{1/S_0(0)\}$ is preferably established.

When the lens 18' includes the non-uniform distribution of refractive indices as defined above, a focal length of the lens 18' in the direction of sub-scanning is deviated from the focal length $f_1(0)$ by a value $\Delta f_1 = -1/2\Delta n(0) \times d_1$. This will be readily understood from the above description.

Accordingly, a distance $S_1'$ of a position in the direction of sub-scanning, at which a line image is formed by the lens 18', from the rear focusing point of the lens 18' is expressed as follow:

$$S_1' = 1/[\{1/f_1(0)\} - 2\Delta n(0) \times d_1 - \{1/S_0(0)\}]$$

A distance $S_2$ from the position of image formation to the front principal point of the lens 19 is expressed as follows:

$$S_2 = S_1' - S_1(0)$$

Assuming that a distance from a position of image formation (in the direction of sub-scanning), at which the lens 19, which does not include distribution of refractive indices, forms an image, to the rear principal point of the lens 19 is $S_2'$, the following expression of relation is preferably established:

$$(1/S_2') = \{1/f_1(0)\} + (1/S_2)$$

$$= \{1/f_1(0)\} + 1/(1/[1/\{1/f_1(0)\} - 2\Delta n(0) \times d_1 - \{1/S_0(0)\}] - S_1(0))$$

The distance $S_2'$ is calculated according to the above expression of relation. A difference from the position of image formation $S_L(^0)$, at which the lens 18' having no distribution of refractive indices defined above forms an image, that is, $|S_2' - S_L(0)|$ is then calculated. When the equality of $\Lambda$ is used to calculate the distance from the position of image formation in the same manner as the calculation of the expression of the left member of the condition (1), the left member of the condition (4) below is provided.

$$|S_L(0) - 1/[\{1/f_2(0)\} + \{\Lambda/(1 - S_1(0) \times \Lambda)\}]|$$

Consequently, it is understood that when the lens 18' includes distribution of refractive indices defined above, the requirement for carrying out optical scanning with a practically appropriate diameter of a light spot in the direction of sub-scanning is that the condition (4) is satisfied:

$$|S_L(0) - 1/[\{1/f_2(0)\} + \{\Lambda/(1 - S_1(0) \times \Lambda)\}]| < \omega_0/2 \qquad (4)$$

When the scanning and image forming lens system serving as the second image formation optical system is composed of two lenses 18' and 19 and only the lens 19 opposed to the scanned surface includes the non-uniform distribution of refractive indices in the direction of sub-scanning defined above, assuming that a refractive index on the optical axis of the lens 19 opposed to the scanned surface is $n_0'(0)$, the distribution of refractive indices inside the lens 19 is defined by an approximate expression of: $n'(z) = n_0'(0) + \Delta n'(0) \times z^2$ in relation to a distance z in the direction of sub-scanning from the optical axis within the section of sub-scanning.

At this time, assume that a focal length of the lens 18' opposed to the light deflector is $f_1(0)$, a distance from the position of image formation for the line image to a front principal point in the direction of sub-scanning of the lens 18' opposed to the light deflector is $S_0(0)$, a distance from a rear principal point in the direction of sub-scanning of the lens 18' opposed to the light deflector to a front principal point of the lens 19 opposed to the scanned surface is $S_1(0)$, a distance from a rear principal point in the direction of sub-scanning of the lens 19 opposed to the scanned surface to the scanned surface is $S_L(0)$, the radii of curvature on the surfaces of the lens 19 opposed to the scanned surface, which face the deflector and the scanned surface respectively, within the section of sub-scanning are $r_{S3}(0)$ and $r_{S4}(0)$ respectively, the thickness of the lens is $d_3$, a focal length in the direction of sub-scanning calculated using the radii of curvature $r_{S3}(0)$ and $r_{S4}(0)$, the thickness $d_3$, and the refractive index $n_0'(0)$ is $f_2(0)$, and the tolerance for change of the diameter of a light spot in the direction of sub-scanning is $\omega_0$, when the equality of $\Lambda' = \{1/f_1(0)\} - \{1/S_0(0)\}$ is preferably established.

In this case, even when the lens 19 includes the non-uniform refractive index distribution, optical scanning may be possible with an optical spot having an appropriate diameter in the sub-scanning direction, if the following condition (5) is satisfied:

$$|S_L(0) - 1/[\{1/f_2(0)\} + \{\Lambda'/(1-S_1(0)\times\Lambda')\} - 2\Delta n'(0)\times d_3]| < \omega_0/2 \quad (5)$$

Further, when the scan mg and image forming lens system serving as the second image formation optical system is composed of two lenses and both of these two lenses, the lens 18' opposed to the deflector and the lens 19 opposed to the scanned surface, include the non-uniform distribution of refractive indices in the direction of sub-scanning, assuming that a refractive index on the optical axis of the lens 18' opposed to the light deflector is $n_0(0)$, the distribution of refractive indices inside the lens 18' is defined by an approximate expression of $n(z) = n_0(0) + \Delta n(0) \times z^2$ in relation to a distance z in the direction of sub-scanning from the optical axis within the section of sub-scanning, and assuming that a refractive index on the optical axis of the lens 19 opposed to the scanned surface is $n_0'(0)$, the distribution of refractive indices inside the lens 19 is defined by an approximate expression of $n'(z) = n_0'(0) + \Delta n'(0) \times z^2$ in relation to a distance z in the direction of sub-scanning from the optical axis within the section of sub-scanning.

Further assume that the radii of curvature on the surfaces of the lens 18' opposed to the light deflector, which face the deflector and scanned surface respectively, within the section of sub-scanning are $r_{S1}(0)$ and $r_{S2}(0)$ respectively, the thickness of the lens 18' is $d_1$, a focal length in the direction of sub-scanning calculated using the radii of curvature $r_{S1}(0)$ and $r_{S2}(0)$, the thickness $d_1$, and the refractive index $n_0(0)$ is $f_1(0)$, and that the radii of curvature on the surfaces of the lens 19 opposed to the scanned surface, which face the deflector and the scanned surface respectively, within the section of sub-scanning are $r_{S3}(0)$ and $r_{S4}(0)$ respectively, the thickness of the lens 19 is $d_3$, a focal length in the direction of sub-scanning calculated using the radii of curvature $r_{S3}(0)$ and $r_{S4}(0)$, the thickness $d_3$, and the refractive index $n_0'(0)$ is $f_2(0)$, a distance from the position of image formation for the line image to a front principal point in the direction of sub-scanning of the lens 18' opposed to the light deflector is $S_0(0)$, a distance from a rear principal point in the direction of sub-scanning of the lens 18' opposed to the light deflector to a front principal point of the lens 19 opposed to the scanned surface is $S_1(0)$, a distance from a rear principal point in the direction of sub-scanning of the lens 19 opposed to the scanned surface to the scanned surface is $S_L(0)$, and the tolerance for change of the diameter of a light spot in the direction of sub-scanning is $\omega_0$, and the equality of $\Lambda = \{1/f_1(0)\} - 2\Delta n(0) \times d_1 - \{1/S_0(0)\}$ is established. In this case, it will be known that, even when the lens 19 includes the non-uniform refractive index distribution described above, optical scanning may be possible with an optical spot having an appropriate diameter in the sub-scanning direction, if the following condition (6) is satisfied:

$$|S_L(0) - 1/[\{1/f_2(0)\} + \{\Lambda/(1-S_1(0)\times\Lambda)\} - 2\Delta n'(0)\times d_3]| < \omega_0/2 \quad (6)$$

Now, exemplary preferred embodiments and comparable examples will be described below. The first to third preferred embodiments are embodiments of an optical scanning apparatus based on the first to second aspects of preferred embodiments of the present invention. The first to third comparable examples are presented for comparison with the first to third preferred embodiments. The fourth preferred embodiment is a preferred embodiment of the present invention according to the third to fifth aspects thereof. The fifth preferred embodiment is an example of a scanning and image forming lens system according to the sixth aspect of preferred embodiments of the present invention and the sixth preferred embodiment is an example of a scanning and image forming lens system according the seventh aspect of preferred embodiments of the present invention.

An optical scanning apparatus according to the first to third preferred embodiments and first to third comparable examples is constructed as illustrated in FIG. 1(*a*). However, in the preferred embodiments and comparable examples, a rotary single-surface mirror is preferably used as a light deflector in place of the rotary polygon mirror 16 shown in FIG. 1(*a*). The rotary single-surface mirror is designed so that the axis of rotation of a deflecting reflective surface thereof will be contained in the deflecting reflective surface, whereby occurrence of a sag condition is prevented.

In the first to third preferred embodiments and first to third comparable examples, a light beam coupled by the coupling lens included in the light source is transformed into a parallel light beam, and converged to form a line image elongated in the direction of main scanning at the position of the axis of rotation on the deflecting reflective surface of the light deflector via the cylindrical lens. The start point of the deflection of a light beam imparted by the light deflector will therefore not vary.

On the optical path succeeding the light deflector, distances $d_0$, $d_1$, and $d_2$ are defined as shown in FIG. 1(*a*) The distance $d_1$ corresponds to the thickness of the scanning and image forming lens that is a single lens, and serves as the element "d" in the left member of the condition (1).

The shape of the surface of the scanning and image forming lens facing the light deflector is indicated by $X1(Y)$ and $x_1(Y)$, and the shape of the surface thereof facing the scanned surface is indicated with $X_2(Y)$ and $x_2(Y)$.

$X_1(Y)$ and $X_2(Y)$ are defined by a known expression as below for reproducing an aspherical shape within a plane including the optical axis and arranged parallel to the direction of main scanning. Assuming that an X axis is defined in the direction of the optical axis and a Y axis is defined in the direction of main scanning, and that $R_i$ is a paraxial radius of curvature, and $K_i$, $A_i$, $B_i$, $C_i$, $D_i$, etc. are constants, the following equation is established:

$$X_i(Y) = Y^2 \Big/ \left[ R_i + R_i \sqrt{1 - (1+K_i)(Y/R_i)^2} \right] + A_i \times Y^4 + B_i \times Y^6 + C_i \times Y^8 + D_i \times Y^{10} + \ldots$$

Thus, the aspherical shape is specified by determining the values of the paraxial radius of curvature $R_i$ and the constants $K_i$, $A_i$, $B_i$, $C_i$, and $D_i$ (i=1 for the surface facing the light deflector, and i=2 for the surface facing the scanned surface).

The first to third preferred embodiments and first to third comparable examples share the same arrangement of optical elements within the plane which includes the optical axis and which is arranged parallel to the direction of main scanning. The values $R_i$, $K_i$, $A_i$, $B_i$, $C_i$, $D_i$ (i=1, 2), and $d_i$ (i=any of 0 to 3), and the value of the refractive index $n_0(0)$ at the position of the optical axis which is regarded as the refractive index of the material of the scanning and image forming lens 18 are determined independently among the preferred embodiments and comparable examples.

Data concerning the plane which includes the optical axis and which is arranged parallel to the direction of main scanning (used in common among the first to third preferred embodiments and first to third comparable examples) is as follows:

$S = \infty$ (a coupled light beam is a parallel light beam)

$W = 216$ mm, $L = 175$ mm

| i | $R_i$ | $d_i$ | $n_0(0)$ |
|---|---|---|---|
| 0 | | 29.887 | |
| 1 | 137.503 | 12.364 | 1.53664 |
| 2 | −154.348 | 132.649 | |

$X_1(Y)$:

$R_1 = 137.503$    $K_1 = -92.438$ $A_1 = -1.11822E - 6$    $B_1 = 7.28745E - 10$ $C_1 = -3.20311E - 13$    $D_1 = 9.55204E - 17$ $X_2(Y)$:

$R_2 = -154.248$    $K_2 = 5.36873$ $A_2 = -2.51300E - 6$    $B_2 = 1.95625E - 9$ $C_2 = -1.18490E - 12$    $D_2 = 3.38372E - 16$

Incidentally, the unit of a value indicating a linear dimension is millimeter (mm). A value succeeding E indicates a power of 10. For example, E−9 indicates $10^{-9}$. The immediately preceding value is multiplied by this value. The same applies to the subsequent description.

FIGS. 3(a) and 3(b) respectively show a curvature of field and distortion in the direction of main scanning which are reproduced using the foregoing data. The distortion shown in FIG. 3(b) is defined by the equation below, where $\theta$ is an angle of deflection (angle of view) of a deflected light beam, $H(\theta)$ is an actual image height defined by a light spot deflected by the angle of deflection $\theta$, $H_0(\theta)$ (=$k_0 \times \theta$, where $k_0$ is a constant of proportion) is an ideal image height defined by a light spot deflected by the angle of deflection $\theta$.

$[\{\{H(\theta)-H_0(\theta)\}/H_0(\theta)\} \times 100(\%)$ $[\{\{H(\theta)-k_0 \times \theta\}/k_0 \times \theta\} \times 100(\%)$ Consequently, the distortion is regarded as a characteristic of a lens analogous to a known fθ characteristic.

In the first to third preferred embodiments and first to third comparable examples described below, it is assumed that the thickness of the center of the cylindrical lens serving as the first image formation optical system is $D_0$, the radii of curvature within the section of sub-scanning are $R_{s1}$ (on the surface facing the light source) and $R_{s2}$ (on the surface facing the light deflector), a distance from the surface facing the light deflector to the deflecting reflective surface is $D_1$, and a refractive index of the material is N.

According to the first to third preferred embodiments and first to third comparable examples, the values $D_0$, $R_{s1}$, $R_{s2}$, $D_1$, and N, the values $n_0(0)$, $\Delta n(0)$, $r_{s1}(0)$, $r_{s2}(0)$, $S0(0)$, $S_L(0)$, $\omega_0$, W, L, and Z (a half width of a function of the intensity measured in the direction of sub-scanning of a deflected light beam that launches on the surface of the scanning and image forming lens facing the light deflector), the value of the solution of the left member of the condition (1), and the value of a parameter $Z \times \Delta n(0)$ of the condition (2), and the values of parameters $\{r_{s2}(0)/r_{s1}(0)\} \times (W/L)^2$ and $\beta(0)$ are preferably as set forth below.

To begin with, data according to the first to third preferred embodiments will be listed below.

| | First Preferred Embodiment | Second Preferred Embodiment | Third Preferred Embodiment |
|---|---|---|---|
| $D_0$ | 3 | 3 | 3 |
| $R_{s1}$ | 30.0 | 30.0 | 30.0 |
| $R_{s2}$ | ∞ | ∞ | ∞ |
| $D_1$ | 56.703 | 56.703 | 56.703 |
| N | 1.51118 | 1.51118 | 1.51118 |
| $r_{s1}(0)$ | −60 | −60 | −35 |
| $r_{s2}(0)$ | −13.54 | −14.15 | −11.96 |
| $n_0(0)$ | 1.53664 | 1.54664 | 1.54664 |
| $\Delta n(0)$ | 2.70E-5 | −5.0E-5 | 1.0E-4 |
| W | 216 | 216 | 216 |
| L | 175 | 175 | 175 |
| $S_0(0)$ | 39.39 | 39.51 | 40.18 |
| $S_L(0)$ | 130.50 | 130.38 | 129.13 |
| Z | 1.02 | 1.02 | 1.02 |
| $\omega_0/2$ | 3.35 | 3.35 | 3.9 |
| Left member of condition (1) | 3.01 | 0.57 | 0.53 |
| $Z^2 \times \Delta n(0)$ | 2.81E-5 | −5.20E-5 | 1.04E-4 |
| $\{r_{s2}(0)/r_{s1}(0)\} \times (W/L)^2$ | 0.279 | 0.291 | 0.422 |
| $\beta(0)$ | 3.39 | 3.31 | 3.23 |

Figure 4:
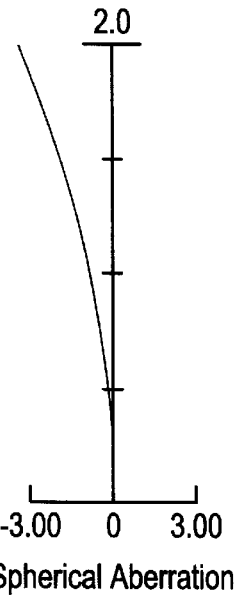
FIG. 4 is a diagram showing a spherical aberration in the direction of sub-scanning according to the first preferred embodiment.
Figure 5:
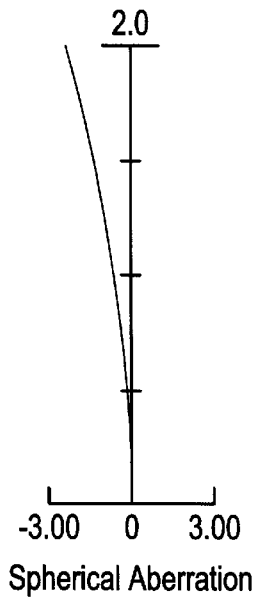
FIG. 5 is a diagram showing a spherical aberration in the direction of sub-scanning according to the second preferred embodiment.
Figure 6:
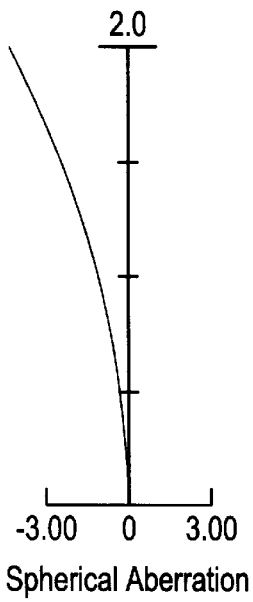
FIG. 6 is a diagram showing a spherical aberration in the direction of sub-scanning according to the third preferred embodiment.

FIGS. 4 to 6 show graphs of spherical aberrations according to the first to third preferred embodiments.

The first to third preferred embodiments preferably satisfy the conditions (1) and (2). As shown in FIGS. 4 to 6, the spherical aberrations are moderate. In particular, according to the second preferred embodiment, $\Delta n(0)<0$ is met. The spherical aberration is thus corrected more successfully.

In the first and second preferred embodiments, the shapes of the both surfaces of the scanning and image forming lens within the section of sub-scanning and a section parallel to the section of sub-scanning are preferably arc-like. The radii of curvature on the surfaces are preferably defined by the listed values $r_{s1}(0)$ and $r_{s2}(0)$.

In the first and second preferred embodiments, the shapes $x_1(Y)$ and $x_2(Y)$ are defined as shapes realized by rotating the shapes $X_1(Y)$ and $X_2(Y)$ about axes that are separated from the surfaces of the lens by distances $r_{s1}(0)$ and $r_{s2}(0)$ along the optical axis and that are parallel to the direction of main scanning and perpendicular to the optical axis.

Figure 1B:
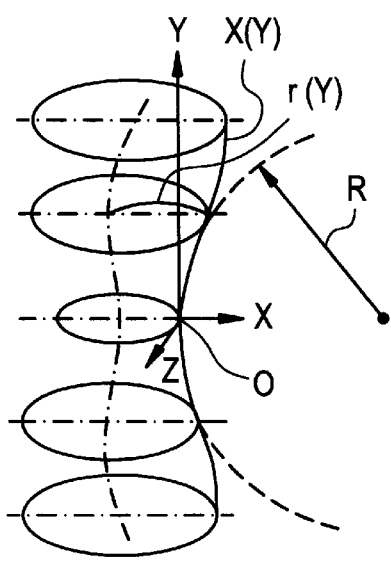
FIG. 1(b) is a diagram illustrating a profile of a first surface of an optical scanning lens according to a preferred embodiment of the present invention.
Figure 1C:
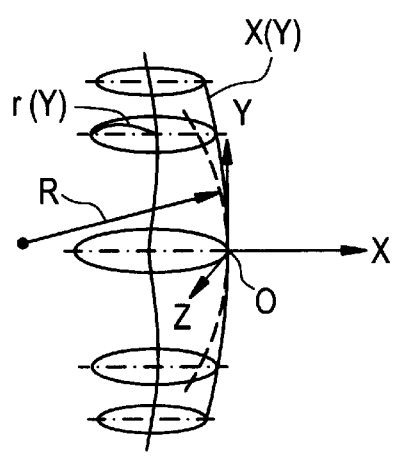
FIG. 1(c) is a diagram illustrating a profile of a second surface of an optical scanning lens according to a preferred embodiment of the present invention.

In the third preferred embodiment, the surfaces of the scanning and image forming lens 18 are preferably special toric surfaces as shown in FIGS. 1(b) or 1(c). As described previously, the shapes of the surfaces of the lens relative to a plane parallel to the section of sub-scanning are, as shown in FIG. 1(a), indicated symbolically as $x_1(Y)$ and $x_2(Y)$. Y denotes a coordinate of the plane parallel to the section of sub-scanning in the direction of main scanning.

In FIGS. 1(b) and 1(c), a curve X(Y) indicates the non arc-like shape (R is a paraxial radius of curvature used as an element of the above equation). The special toric surfaces are, as shown in FIGS. 1(b) and 1(c), surfaces on which the radius of a circle of curvature within a plane section (plane XZ in the drawing) parallel to the section of sub-scanning direction varies continuously according to a Y coordinate of a non arc-like shape (distance in the direction of main scanning from the optical axis). At this time, a line passing through the centers of curvature defined by the varying radius of curvature r(Y) is nonlinear in general as indicated with a dot-dash line in FIGS. 1(b) and 1(c).

When the radii of curvature $r_{S1}(Y)$ and $r_{S2}(Y)$ are symmetrical with respect to the optical axis, they are expressed by the following polynomial of even-numbered orders:

$$r_{sk}(Y) = r_{sk}(0) + \Sigma a_{kj} \times Y - 2j$$

where k is set to 1 for the surface facing the deflecting reflective surface and to 2 for the surface facing the scanned surface, and j is a natural number of any of 1, 2, 3 etc. Y—2j indicates $Y^{2j}$.

Moreover, when the radii of curvature $r_{S1}(Y)$ and $r_{S2}(Y)$ are asymmetrical with respect to the optical axis, they are expressed by the following polynomial:

$$r_{sk}(Y) = r_{sk}(0) + \Sigma X b_{kj} \times Y - j (j=1,2,3 \text{ etc.})$$

As mentioned above, in the first to third preferred embodiments, the rotary single-surface mirror is used as the light deflector and designed so that the axis of rotation of the deflecting reflective surface will be contained in the deflecting reflective surface. Deflection of a light beam is achieved symmetrically with respect to the optical axis of the scanning and image forming lens. The polynomial of even-numbered orders is therefore preferably used.

In the third preferred embodiment, $$X_1(Y): r_{s1}(Y) = r_{s1}(0) + \sum a_{1j} \times Y - 2j$$

$$r_{s1}(0) = -35$$

$$a_{11} = 2.78772E - 2 \quad a_{12} = -1.11838E - 4$$
$$a_{13} = 1.24795E - 7 \quad a_{14} = -2.06364E - 11$$
$$a_{15} = -6.94829E - 14 \quad a_{16} = 3.9456E - 17$$

$$X_2(Y): r_{s2}(Y) = r_{s2}(0) + \sum a_{2j} \times Y - 2j$$

$$r_{s2}(0) = -11.96$$

$$a_{21} = -5.58E - 4$$

$$a_{22} = a_{23} = a_{24} = a_{25} = a_{26} = \ldots = 0.0$$

In the scanning and image forming lens of the third preferred embodiment, it is assumed that non-uniformity in refractive index is not observed inside the lens in relation to the angle of deflection $\theta_{MAX}$ or $\theta_{MIN}$.

Data in the first to third comparable examples is listed below.

|  | First comparable example | Second comparable example | Third comparable example |
| --- | --- | --- | --- |
| $D_0$ | 3 | 3 | 3 |
| $R_{s1}$ | 30.0 | 30.0 | 30.0 |
| $R_{s2}$ | ∞ | ∞ | ∞ |
| $D_1$ | 56.703 | 56.703 | 56.703 |
| N | 1.51118 | 1.51118 | 1.51118 |
| $r_{S1}$ (0) | −14 | −35 | −35 |
| $r_{S2}$ (0) | −10.04 | −11.38 | −12.00 |
| $n_0$ (0) | 1.53664 | 1.53664 | 1.53664 |
| $\Delta n$ (0) | 2.70E-5 | 2.0E-4 | 1.0E-4 |
| W | 216 | 217 | 216 |
| L | 175 | 175 | 175 |
| $S_0$ (0) | 43.50 | 39.97 | 40.20 |
| $S_L$ (0) | 122.89 | 129.37 | 129.11 |

-continued

|  | First comparable example | Second comparable example | Third comparable example |
| --- | --- | --- | --- |
| Z | 1.02 | 1.02 | 1.43 |
| $\omega_0/2$ | — | — | — |
| Left member of condition (1) | 2.97 | 0.92 | 3.28 |
| $Z^2 \times \Delta n$ (0) | 2.81E-5 | 2.08E-4 | 2.04E-4 |
| $\{r_{S2} (0)/ r_{S1} (0) \times (W/L)^2$ | 0.885 | 0.401 | 0.423 |
| $\beta$ (0) | 2.89 | 3.26 | 3.29 |

Figure 7:
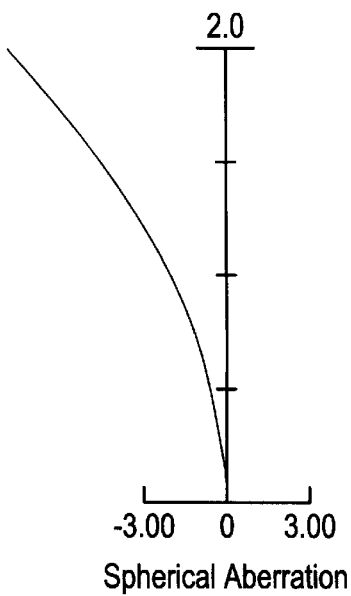
FIG. 7 is a diagram showing a spherical aberration in the direction of sub-scanning according to a first comparable example.
Figure 8:
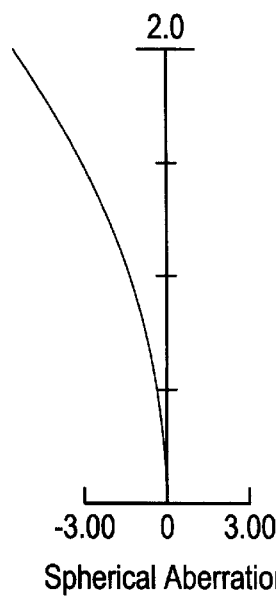
FIG. 8 is a diagram showing a spherical aberration in the direction of sub-scanning according to a second comparable example.
Figure 9:
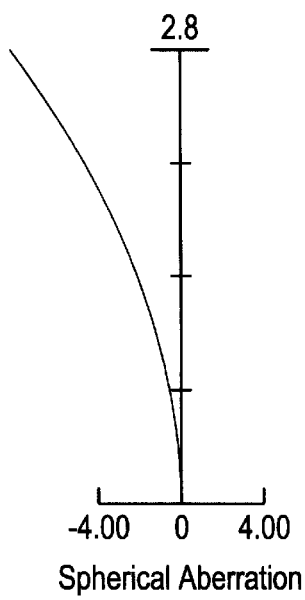
FIG. 9 is a diagram showing a spherical aberration in the direction of sub-scanning according to a third comparable example.

FIGS. 7 to 9 show graphs of spherical aberrations according to the first to third comparable examples.

As apparent from the comparison of the first to third preferred embodiments with the first to third comparable examples, the spherical aberrations according to the first to third preferred embodiments are smaller than those according to the first to third comparable examples. Accordingly, the diameter of a light spot in the sub-scanning direction can be minimized.

An optical scanning and image forming apparatus according to the fourth, fifth and sixth preferred embodiments is constructed as illustrated in FIG. 14. A rotary single-surface mirror is used as a light deflector and designed so that the axis of rotation of a deflecting reflective surface will be contained in the deflecting reflective surface. A sag condition will therefore not occur. A light beam coupled by a coupling lens included in a light source is transformed into a parallel light beam, and converged to form a line image elongated in a direction of main scanning at the position of the axis of rotation of the deflecting reflective surface of the light deflector by means of a cylindrical lens. The start point of deflection of a light beam caused by the light deflector will therefore not vary.

As shown in FIG. 14, distances $d_0$, $d_1$, $d_2$, $d_3$, and $d_4$ are specified along the optical path succeeding the light deflector. The distance $d_1$ corresponds to the thickness of a scanning and image forming lens opposed to the light deflector and serves as an element $d_1$ in the equality of $\Lambda$ defining the condition (4).

A radius of curvature or a paraxial radius of curvature within a plane containing the optical axis of a scanning and image forming lens system and lying parallel to the direction of main scanning is indicated by $R_i$ (i=any of 1 to 4), and the refractive index of the material of the lenses 18' and 19 (designed refractive index which is uniform inside the lens) is indicated with $N_j$ (j=1 or 2).

The shape of the both surfaces of the lens 18', which is opposed to the light deflector and included in the scanning and image forming lens system, are non-arc and indicated with $X_1(Y)$ and $X_2(Y)$ as mentioned previously.

Data concerning the plane containing the optical axis and lying parallel to the direction of main scanning is the same in the fourth, fifth and sixth preferred embodiments:

S = ∞ (a coupled light beam is a parallel light beam)
W = 216 mm, L = 175 mm

| i | $R_i$ | $d_i$ | j | $N_j$ |
| --- | --- | --- | --- | --- |
| 0 |  | 29.887 |  |  |
| 1 | 137.503 | 12.364 | 1 | 1.53664 |
| 2 | −154.348 | 20.000 |  |  |
| 3 | −700.0 | 3.0 | 2 | 1.53664 |
| 4 | −700.0 | 111.649 |  |  |

-continued

X₁ (Y):
R₁ = 137.503 K₁ = −92.438
A₁ = −1.11822E-6         B₁ = 7.28745E-10
C₁ = −3.20311E-13        D₁ = 9.55204E-17
X₂ (Y):
R₂ = −154.248            K₂ = 5.36873
A₂ = −2.51300E-6         B₂ = 1.95625E-9
C₂ = −1.18490E-12        D₂ = 3.38372E-16

The shape of the both surfaces of the lens 19 are preferably arc-like, which are specified with the radii of curvature $R_3$ and $R_4$, within the plane containing the optical axis and lying parallel to the direction of main scanning.

Figure 10A:
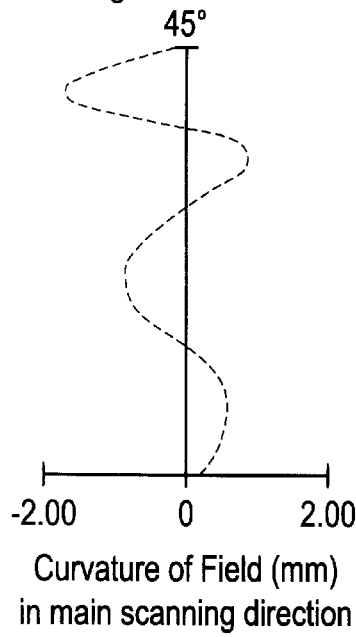
FIG. 10(a) is a diagram showing a curvature of field in the direction of sub-scanning according to the fourth, fifth and sixth preferred embodiments.
Figure 10B:
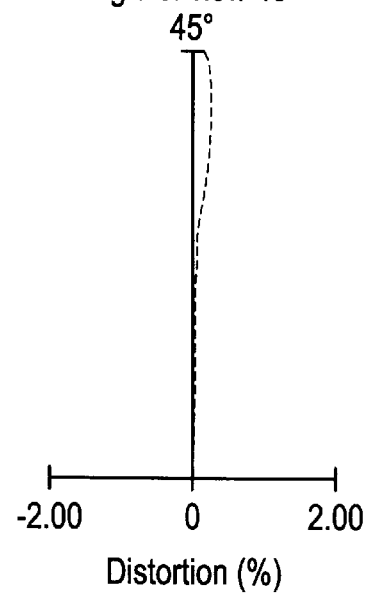
FIG. 10(b) is a diagram showing distortion in the direction of sub-scanning according to the fourth, fifth and sixth preferred embodiments.

FIGS. 10(*a*) and 10(*b*) respectively show a curvature of field and distortion in the direction of main scanning to be reproduced on the basis of the above data (in the same manner as those according to the first to third preferred embodiments).

Data in the fourth to sixth preferred embodiments is listed below.

|  | Preferred Embodiment 4 | Preferred Embodiment 5 | Preferred Embodiment 6 |
|---|---|---|---|
| $D_0$ | 3 | 3 | 3 |
| $R_{s1}$ | 30.0 | 30.3 | 30.3 |
| $R_{s2}$ | ∞ | ∞ | ∞ |
| $D_1$ | 56.703 | 56.703 | 56.703 |
| N | 1.51118 | 1.51118 | 1.51118 |
| $r_{s1}(0)$ | −500 | −500 | −500 |
| $r_{s2}(0)$ | −450 | −450 | −450 |
| $n_0(0)$ | 1.53664 | 1.53664 | 1.53664 |
| $\Delta n(0)$ | 2.70E-5 | 0 | 2.0E-05 |
| $r_{s3}(0)$ | −31 | −31 | −31 |
| $r_{s4}(0)$ | −12.45 | −13.03 | −12.6 |
| $\Delta n'(0)$ | — | 1.0E-05 | 1.0E-05 |
| W | 216 | 216 | 216 |
| L | 175 | 175 | 175 |
| $S_0(0)$ | 103.95 | 103.95 | 03.95 |
| $S_1(0)$ | −43.57 | −43.48 | −43.55 |
| $S_L(0)$ | 110.41 | 110.31 | 110.38 |
| $f_1(0)$ | 7718.923 | 7718.923 | 7718.923 |
| $f_2(0)$ | 36.698 | 39.579 | 37.427 |
| Λ | −0.0102 | — | −0.0100 |
| Λ' | — | −0.0095 | — |
| Left member of condition (6) | 0.38 | — | — |
| Left member of condition (7) | — | 0.2 | — |
| Left member of condition (8) | — | — | 0.8 |
| $\omega_0/2$ | 4.1 | 4.1 | 14.1 |
| β (0) | 1.82 | 1.81 | 1.83 |

Both surfaces of the lens 19 are preferably shaped like arcs, which are specified with the radii of curvature $r_{s3}(0)$ and $r_{s4}(0)$, within the plane parallel to the section of sub-scanning direction.

The fourth preferred embodiment preferably satisfies condition (4). The value β(0) is smaller than the corresponding values in the first to third preferred embodiments (the diameter of a light spot in the direction of sub-scanning is smaller than those in the first to third embodiments). Moreover, the power in the direction of sub-scanning of the lens 18' opposed to the light deflector, $P_1$, is preferably set to 1.3E−4 and the power in the direction of sub-scanning of the lens 19 opposed to the scanned surface, $P_2$, is preferably set to 2.6E−2. Thus, the condition (5) of "$P_2 > P_1$" is satisfied. The shape of the lens 19 opposed to the scanned surface within the section of sub-scanning direction is a meniscus-like shape having a concave surface opposed to the light deflector. The front and rear principal points are located near the scanned surface beyond the actual position of the lens. The tolerance for an error of a position at which the lens should be placed is therefore large.

In the fifth preferred embodiment, condition (5) is preferably satisfied and in the sixth preferred embodiment, condition (6) is preferably satisfied. In these preferred embodiments, the value of β(0) is preferably reduced compared with the first, second and third preferred embodiments. Further, the power in the sub-scanning direction of the lens 18' opposed to the light deflector is as follows: $P_1$ is about 1.3E−4 in the fifth and sixth preferred embodiments and the power in the main scanning direction of the lens 19 opposed to the scanned surface: $P_2$ is about 2.5E−2 in the fifth preferred embodiment and 2.7E−2 in the sixth preferred embodiment. Therefore, both the fifth and sixth preferred embodiments preferably satisfy condition (3). Moreover, the configuration of the lens 19 opposed to the scanned surface in the cross section in the sub-scanning direction is a meniscus having a concave surface opposed to the light deflector, and the front and rear principal points are located near to the scanned surface beyond the actual position of the lens. Therefore, the tolerance for an error of a position at which the lens should be placed is large.

Figure 11:
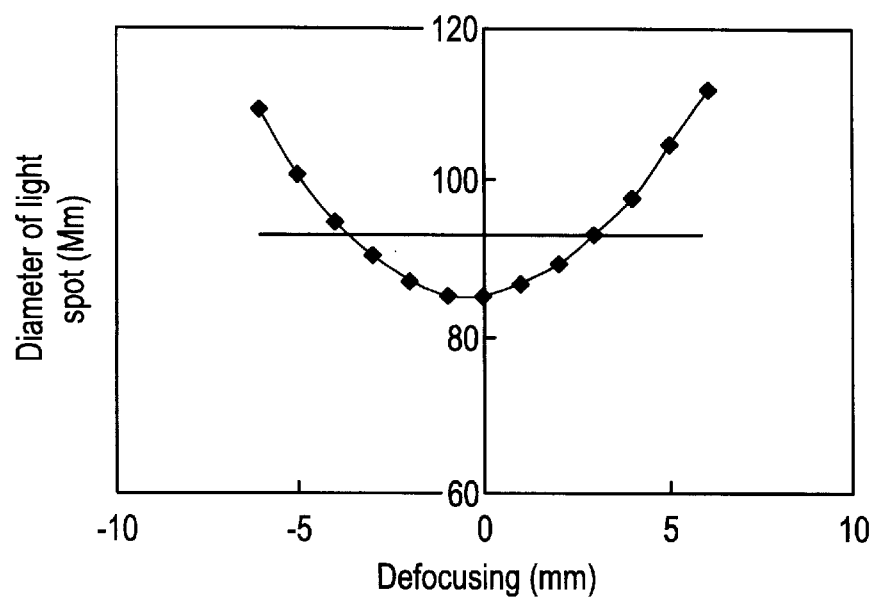
FIG. 11 is a diagram showing the relationship between a magnitude of defocusing and a diameter of a beam spot according to the first and second preferred embodiments.
Figure 12:
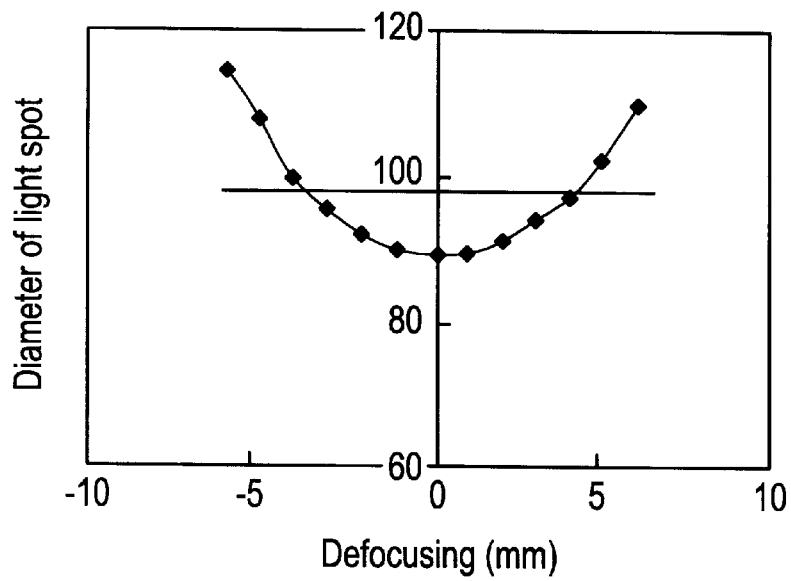
FIG. 12 is a diagram showing the relationship between a magnitude of defocusing and a diameter of a beam spot according to the third preferred embodiment.
Figure 13:
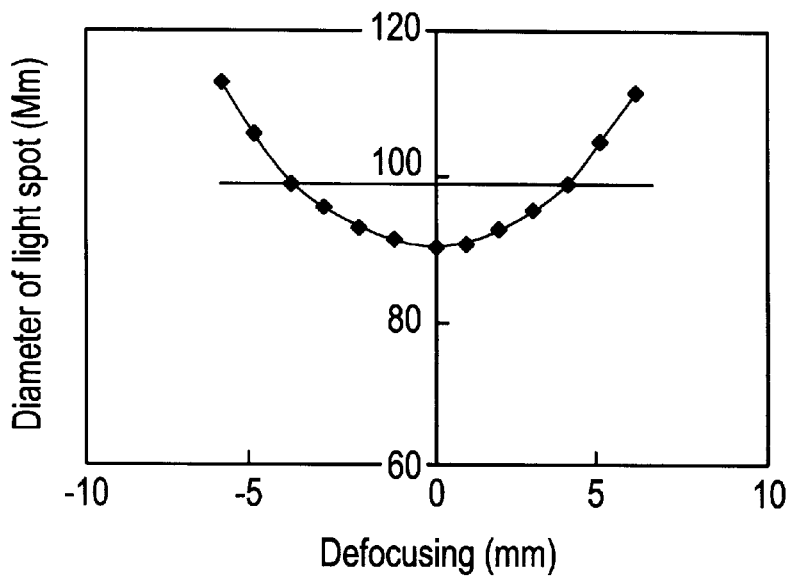
FIG. 13 is a diagram showing the relationship between a magnitude of defocusing and a diameter of a beam spot according to the fourth, fifth and sixth preferred embodiments.

FIGS. 11 to 13 each show a change in the diameter of a light spot in the direction of sub-scanning in relation to a magnitude of defocusing in the direction of sub-scanning (a deviation from the waist of a beam in the direction of sub-scanning). FIG. 11 is a graph concerning the first and second preferred embodiments, FIG. 12 is a graph concerning the third preferred embodiment, and FIG. 13 is a graph concerning the fourth preferred embodiment.

In the graphs, a lateral line indicates the diameter of a light beam that is about 10% larger than the diameter of the waist of the light beam (minimum value of the diameter of the light beam). A range defined by the magnitudes of defocusing indicated by intersections between the lateral line and the curve expressing the change in diameter of a light beam corresponds to the tolerance for change in the diameter of a light spot, $\omega_0$.

In the preferred embodiments and comparable examples, the distribution of refractive indices in the direction of main scanning and the distribution of refractive indices in a direction parallel to the optical axis are ignored because the changes in refractive index in the directions are negligible. The refractive index in the direction parallel to the optical axis affects the optical length of a deflected light beam. However, since the change in refractive index is small and an average refractive index affects a change in optical length, the distribution of refractive indices in the direction parallel to the optical axis is ignored. Actually, the influence of the distribution of refractive indices in the direction parallel to the optical axis has not been observed. In the description, the distribution of refractive indices is not taken into account in defining the principal points. However, there is substantially no problem.

Figure 16A:
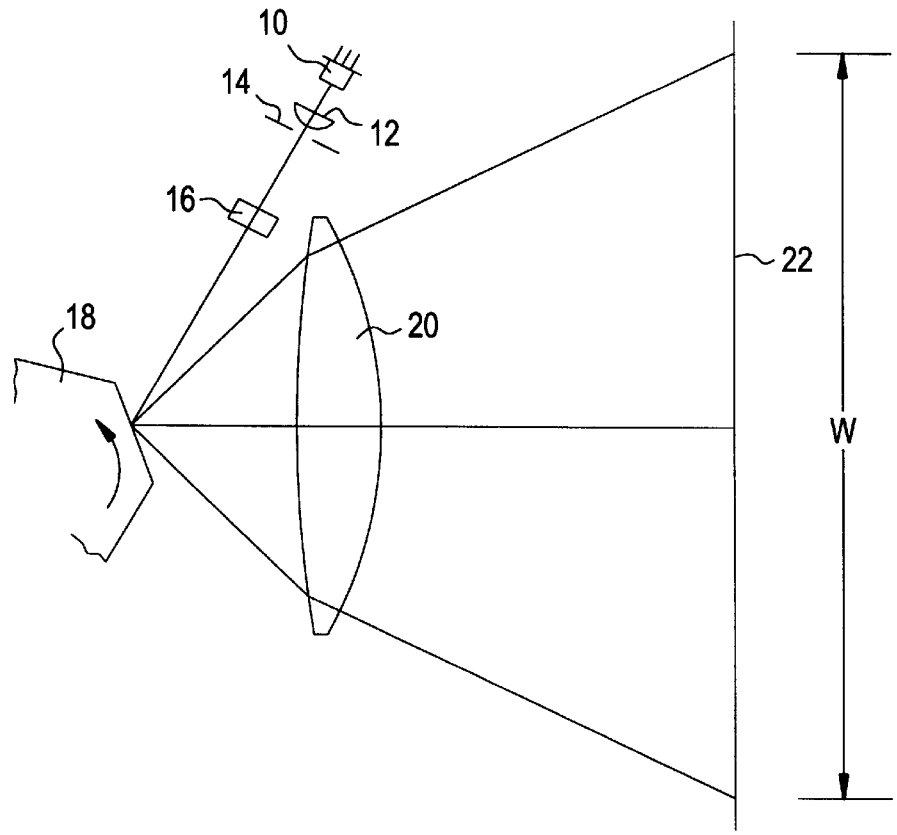
FIG. 16(a) is a diagram of an optical scanning apparatus according to a preferred embodiment of the present invention.

Another preferred embodiment of the present invention is shown in FIGS. 16(*a*), FIG. 16(*b*) and FIG. 16(*c*). As seen in FIG. 16(*a*), which is similar to FIG. 1(*a*), a light beam from a semiconductor laser 10, which constitutes the light source for the optical scanning apparatus shown in FIG. 16(*a*), is coupled with a subsequent optical system via a coupling lens 12. The coupled light beam becomes a parallel beam, a slightly diverging beam or slightly converging beam. The light beam, which is coupled by the coupling lens 12, is transmitted to an aperture 14 and the peripheral portion of the coupled light beam is blocked by the aperture 14 so that the beam is shaped to have a cross sectional shape provided by the aperture 14. The beam is then converged in a sub-scanning direction (the direction perpendicular to the plane of FIG. 16(a)) by a cylindrical lens 16, and then the beam forms a linear image that is elongated in a main scanning direction at a location near a deflecting reflective surface of a polygon mirror 18, which functions as a light deflector. The cylindrical lens 16 may be replaced by a cylindrical concave mirror, if desired.

The light beam reflected by the deflecting reflective surface of the polygon mirror 18 becomes a deflected beam which is deflected with a constant angular velocity as a result of a constant rotational speed of the polygon mirror 18.

The deflected light beam impinges upon a lens 20 which constitutes a scanning imaging system according to a preferred embodiment of the invention. The lens 20 preferably has a positive power which differs between the main scanning direction and the sub-scanning direction. The lens 20 causes the deflected beam to be converged on a scanning surface 22 as a light spot, via which optical scanning is performed at a constant speed on the effective scanning region W of the scanning surface 22 (which is actually the photosensitive surface of a photosensitive member arranged in this section of the device).

That is, the optical scanning apparatus shown in FIG. 16(a) causes a light beam from a light source 10 to form a linear image which is elongated in a main scanning direction, deflects the beam via a polygon mirror 18 having a deflecting reflective surface near the position where the linear image is formed, and converges the deflected beam on a scanning surface 22 by the scanning imaging system as a light spot to perform optical scanning.

The scanning imaging system of FIG. 16(a) preferably includes a single lens 20. The lens 20 is preferably a gradient-index lens, and its main scanning sectional configuration (the configuration as shown in FIG. 16(a)) is preferably biconvex, at least in the vicinity of the optical axis.

Figure 16B:
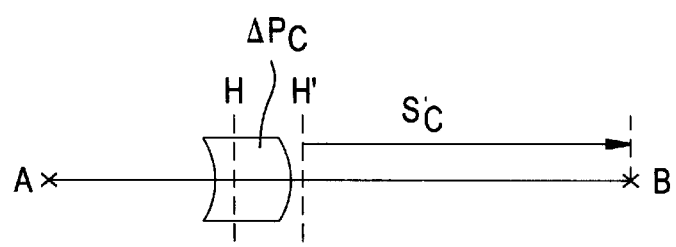
FIG. 16(b) is a diagram illustrating an optical scanning lens according to the preferred embodiment of the present invention of FIG. 16(a) for explaining a desired condition of the preferred embodiment of the present invention shown in FIG. 16(a)
Figure 16C:
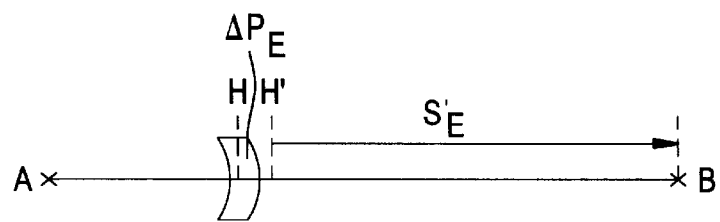
FIG. 16(c) is a diagram illustrating an optical scanning lens according to the preferred embodiment of the present invention of FIG. 16(a) for explaining a desired condition of the preferred embodiment of the present invention shown in FIG. 16(a)

FIGS. 16(b) and 16(c) illustrate the shape of the optical scanning lens 20, according to preferred embodiments of the present invention, in a section in the sub-scanning direction (FIG. 16(b)) and in a section in the main scanning direction (FIG. 16(c)). As illustrated, the optical scanning lens 20 within the section of sub-scanning direction preferably has a meniscus shape having a concave surface opposed to the deflecting reflective surface (left-hand side in FIG. 16(b)). The front principal point H and the rear principal point H' in the direction of sub-scanning are located on the side of the scanned surface (right-hand side in FIG. 16(b)) beyond the lens body. The power in the direction of sub-scanning provided by the optical scanning lens 20 is therefore lower than the power in the direction of sub-scanning attained at the actual position of the optical scanning lens 20. Consequently, the influence of an error of the position of the optical scanning lens 20 upon the performance of image formation can be reduced.

Figure 17A:
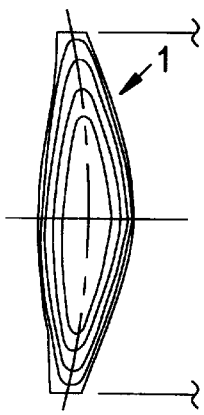
FIG. 17(a) is a schematic diagram illustrating an example of a distribution of refractive indices in a scanning lens according to a preferred embodiment of the present invention.
Figure 17B:
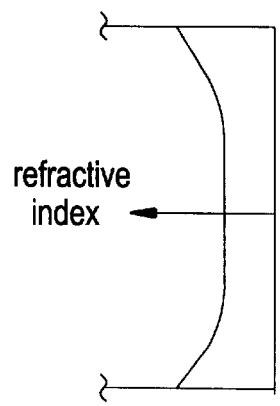
FIG. 17(b) is a drawing illustrating a distribution of refractive indices in the main scanning direction at the virtual cross section illustrated in FIG. 17(a) at the center portion of the thickness-wise direction of the lens, which is indicated by a line-and-dot line in FIG. 17(a)
Figure 17C:
FIG. 17(c) is a drawing illustrating a distribution of refractive indices of the lens 1 in the sub-scanning direction at a virtual cross section of the lens 1 in a plane including the optical axis and parallel to the sub-scanning direction, illustrated via contour lines.
Figure 17E:
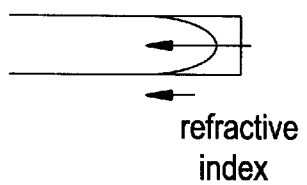
FIG. 17(e) is a drawing illustrating a distribution of refractive indices at a cross section at the center of the thickness-wise direction of the lens in FIG. 17(c)
Figure 17D:
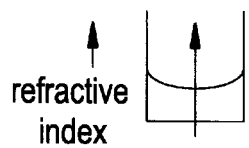
FIG. 17(d) is a drawing illustrating a distribution of refractive indices at the virtual cross section in a plane parallel to the sub-scanning direction including the optical axis.

FIGS. 17(a)–17(e) are schematic diagrams for illustrating the refractive index distribution in the lens 20. FIG. 17(a) is a contour representation of the refractive index distribution in the main scanning cross-section of the lens 20. The variation in refractive index along the chain line is shown in FIG. 17(b). As seen in FIG. 17(b), the refractive index gradually increases from the central portion of the lens to the end portions in the main scanning direction. FIG. 17(c) is a contour representation of the refractive index distribution in the sub-scanning cross-section of the lens 20 (including the optical axis of the lens 20 and parallel to the sub-scanning direction). FIG. 17(d) shows the variation in refractive index in the thickness direction in the optical axis in the sub-scanning cross-section, and FIG. 17(e) shows the refractive index distribution in the sub-scanning direction in the sub-scanning cross-section. As shown in FIG. 17(e), the refractive index distribution in the sub-scanning direction is such that the refractive index increases as the optical axis is deviated from in the sub-scanning direction. This tendency is observed not only in the sub-scanning cross-section including the optical axis of the lens 20 but also in an arbitrary cross-section parallel to the sub-scanning cross-section. However, as the optical axis of the lens 20 is deviated from in the main scanning direction, the variation in the refractive index in the sub-scanning direction (the difference between the refractive index in the main scanning cross-section and the refractive index in the peripheral portion in the sub-scanning direction) decreases.

This will be easily understood since, in FIG. 17(a), the distance between refractive index contour lines increases and the variation in refractive index decreases as the optical axis is deviated from in the main scanning direction.

Of the above-mentioned refractive index distributions, it is mainly the refractive index distribution in the sub-scanning direction that causes the unevenness in scanning line pitch (See FIG. 17(e)).

The influence of the refractive index distribution in the sub-scanning direction on the optical performance of the lens 20 mainly appears as a variation in focal distance in image forming action in the sub-scanning direction. As stated above, in the optical scanning lens 20, the refractive index distribution in the sub-scanning direction is a distribution in which the refractive index increases according to deviation from the optical axis. Such a refractive index distribution is equivalent to a concave lens.

Figure 18:
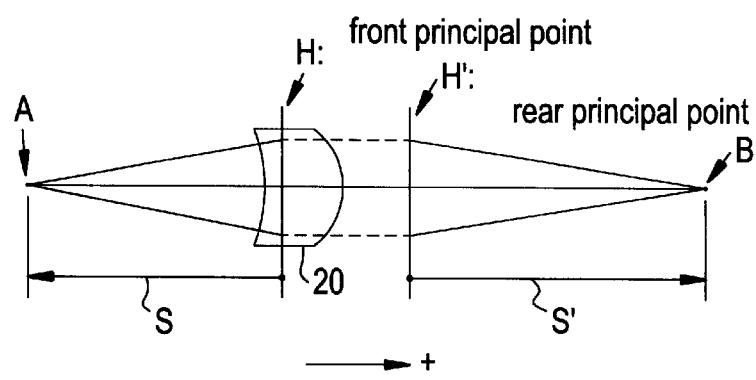
FIG. 18 is a diagram illustrating an image forming function in the sub-scanning direction of the gradient index lens according to a preferred embodiment of the present invention.

FIG. 18 is a diagram showing the image forming performance of the lens 20 in the sub-scanning direction. Suppose the front principal point of the lens 20 is H, the rear principal point thereof is H', the distance from the front principal point H to an object point A is S, and the distance from the rear principal point H' to an image point B is S'. Assuming that the power in the sub-scanning direction when the refractive index of the lens 20 is a fixed value $N_0$ is P (the inverse of the focal length), the formula expressing the imaging relationship is given as follows:

$$(1/S')=(1/S)+P \tag{17}$$

Assuming that a variation $\Delta P$ in the power P caused by the generation of a non-uniform refractive index distribution in which refractive index increases as the optical axis is deviated from in the sub-scanning direction, the displacement $\Delta S'$ of the image point B caused by the variation in the power $\Delta P$ is obtained as follows. By solving equation (17) with respect to S', the following equation is obtained:

$$S'=S/(S \cdot P+1) \tag{18}$$

Thus, assuming that the variation is $\Delta P$, and differentiating both sides of the equation, the following equation is obtained:

$$\Delta S'=S^2/(S \cdot P+1)^2 \cdot (-1)\Delta P \tag{19}$$

Since the variable index distribution which increases as the optical axis deviates in the sub-scanning direction, is equivalent to a concave lens, the power variation $\Delta P$ is negative, and the right-hand side of equation (19) is positive. Thus, the variation in power ΔP is such that the image point B is displaced away from the rear principal point H'. This is essentially enlarging the focal length of the lens 20 (the value calculated based on the assumption that the refractive index is uniform).

By solving equation (19) with respect to ΔP, the following equation is obtained:

$$\Delta P = \Delta S'(S \cdot P + 1)^2 / S^2 \qquad (20)$$

Assuming that the value of power variation ΔP in the sub-scanning direction of the scanning imaging system is $\Delta P_C$ at the optical axis of the lens 20 and $\Delta P_E$ in the most remote optical axis of the effective scanning region W, the variation in refractive index in the sub-scanning direction decreases as the optical axis is deviated from in the main scanning direction, as stated above, so that the influence of the refractive index distribution on the power variation also decreases as the optical axis is deviated from.

That is, a condition according to a preferred embodiment of the present invention:

$$|\Delta P_C| > |\Delta P_E| \qquad (8)$$

indicates that the degree of non-uniformity in the sub-scanning direction of the gradient-index lens included in the scanning imaging system is larger in the optical axis section than at the main scanning ends.

Figure 19A:
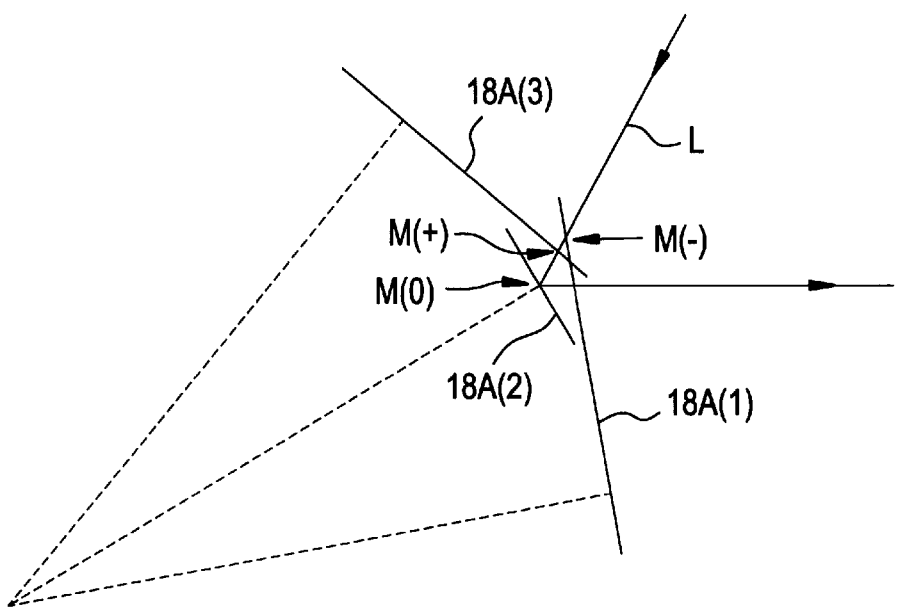
FIG. 19(a) is a diagram illustrating a positional relationship between a deflecting reflective surface 18A of the polygon mirror and a beam (main beam) L from a light source including illustrating a sag condition caused by the polygon mirror.

FIG. 19(a) indicates the positional relationship between the deflecting reflective surface 18A of the polygon mirror 18 and a beam (main beam) L from the light source. As the polygon mirror 18 rotates counterclockwise, the deflecting reflective surface 18A of the polygon mirror varies as indicated by numerals 18A(1), 18A(2) and 18A(3). With this variation, the reflecting position of the beam (main beam) L from the light source varies as: M(—), M(0) and M(+).

The beam L from the light source forms a linear image at the reflecting position M(0). Thus, when the beam from the light source is incident at the reflecting positions M(+) and M(−), a deviation is generated between the deflecting reflective surface 18A and the imaging position of the linear image, and no image is formed when the beam is incident upon the reflecting positions M(+) and M(−). The above deviation between the deflecting reflective surface and the reflecting position is a so-called sag condition, which is generally generated on either side of the reflecting position M(0) asymmetrically as shown in FIG. 19(a). In FIG. 19(a), the sag at the incident position M(−) is larger than the sag at M(+). However, by adjusting the positional relationship between the polygon mirror 18 and the incident-side optical system, it is possible to cause the sag to be generated symmetrically on either side of M(0).

The scanning imaging system is preferably arranged such that the main beam of the beam reflected at the reflecting position M(0) at which the sag is 0 coincides with the optical axis of the scanning imaging system.

Figure 19B:
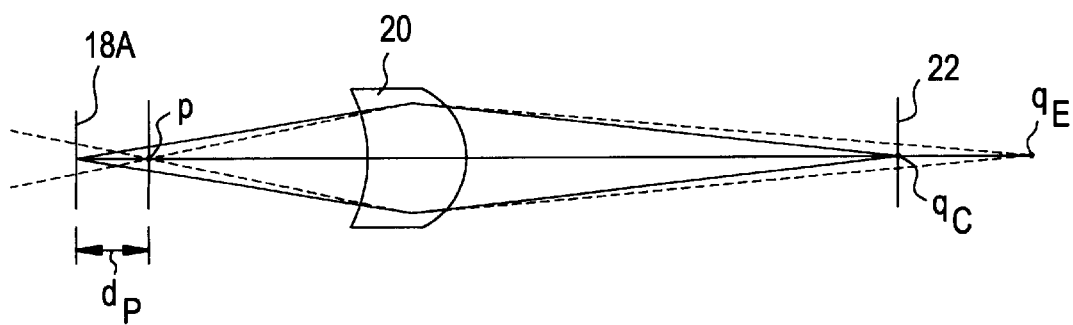
FIG. 19(b) is a diagram illustrating an optical scanning apparatus including the polygon mirror 18A shown in FIG. 19(a) and a conjugate relationship in the sub-scanning direction of the position of the deflecting reflective surface 18A and the position of the scanning surface 22.

In FIG. 19(b), the lens 20 causes the position of the deflecting reflective surface 18A and the position of the scanning surface 22 to be substantially in a conjugate relationship in the sub-scanning direction. In FIG. 19(b), the lens 20 has a uniform refractive index No.

As a result of conjugate relationship described above, the imaging position $q_C$ of the beam reflected at the reflecting position M(0) coincides with the scanning surface 22. The linear image elongated in the main scanning direction coincides with M(0). In FIG. 19(b), assuming that the beam indicated by the broken lines is a beam reflected at the reflecting position M(+), the linear image is formed at the position p in FIG. 19(b), and the image of the linear image due to the lens 20 is formed at the image position $q_E$.

Taking into account the influence of the refractive index distribution in the lens 20 (which is equivalent to elongating the focal length), the actual imaging positions $q_C$ and $q_E$ are deviated to the right in FIG. 19(b) due to the action of the refractive index distribution.

Then, as a result of the configuration and arrangement of the lens 20, the location of the point in the conjugate relationship with the deflecting reflective surface 18A is displaced to the right side of the scanning surface 22 in FIG. 19(b) and ceases to coincide with the scanning surface 22.

Thus, if there is a surface inclination in the deflecting reflective surface 18A of the polygon mirror 18, the scanning line of the light spot on the scanning surface moves a minute distance in the sub-scanning direction to thereby generate unevenness in pitch of the scanning lines.

To solve this problem and to prevent such scanning line pitch unevenness, it is preferable to determine and compensate for the refractive index distribution of the lens 20 during design and before construction thereof, which refractive index distribution can be determined by experiment as stated above, and then considered and corrected for when designing and manufacturing the lens 20.

First, the refractive index distribution of the lens 20 in the sub-scanning cross-section is determined and considered. Taking into account the fact that the refractive index distribution displaces the imaging position of the deflected beam toward the back side of the scanning surface, it will be understood that the imaging position $Q_C$ in the optical axis of the beam without any sag in the sub-scanning direction (the position of $q_C$ as measured from the scanning surface position assuming that the polygon mirror side is negative) when designing the lens 20 with uniform refractive index should be positioned on the polygon mirror side with respect to the scanning surface 22. That is, the factor $Q_C$ should be negative.

Regarding the imaging position $Q_E$ at the most remote optical path of the effective scanning region (the position of $q_E$ as measured from the scanning surface position), the beam incident upon the reflecting position M(+) forms a linear image at the position p in FIG. 19(b), so that $Q_E$ is obtained by magnifying the distance $d_P$ in the drawing by the longitudinal magnification $\alpha (=\beta^2$, where $\beta$ is the lateral magnification).

If there is a plane inclination in the deflecting reflective surface 18A, the image forming position p varies in the sub-scanning direction in accordance with the plane inclination, the variation being magnified by the lateral magnification $\beta$ of the lens 20.

Taking into account the fact that the displacement of the imaging position $q_E$ caused by the action of the refractive index distribution is smaller than the displacement in the optical axis, it will be understood that $Q_E$ must be made positive beforehand (during design and before manufacture of the lens). That is, when $Q_E$ is made positive beforehand, the refractive index distribution acts such that $Q_E$ is increased on the positive side, so that the variation of the light spot formed on the scanning surface is effectively compensated for at the most remote optical path.

Thus, taking into account the fact that $Q_C$ is negative, it will be understood that the condition:

$$Q_E > 0 > Q_C \qquad (7)$$

should be satisfied.

Thus, by satisfying the conditions (7) and (8) (more preferably, (7') and (8')), it is possible to satisfactorily correct the plane inclination of the deflecting reflective surface independently of the presence of the refractive index distribution to effectively reduce the pitch unevenness of the scanning line.

Further, when there is a refractive index distribution, assuming that the above $Q_C$ and $Q_E$ are respectively changed to $Q_C'$ and $Q_E'$, it is desirable that $Q_C'$ and $Q_E'$ satisfy the condition:

$$Q_E' > Q_C' \quad (9)$$

That is, it is desirable that the imaging position, when the refractive index distribution is taken into account, be close to the scanning surface in the optical axis portion. By adopting this unique and novel arrangement, the pitch unevenness is effectively corrected in the portion near the optical axis due to the conjugate relationship between the deflecting reflective surface and the scanning surface position, and, in the peripheral portion of the scanning region, the variation in the image forming position of the deflected beam resulting from the influence of the sag condition is effectively eliminated on the scanning surface, thereby reducing the pitch unevenness.

Using the above-mentioned $\Delta S'$, the relationship between $Q_C$ and $Q_C'$ and that between $Q_E$ and $Q_E'$ can be expressed as follows:

$$Q_C' = Q_C + \Delta S_C', \quad Q_E' = Q_E + \Delta S_E'$$

Thus, by using the above equations (17), (18) and (19), the following equations are obtained:

$$Q_C' = Q_C - S_C'^2 \cdot \Delta P_C, \quad Q_E' = Q_E - S_E'^2 \cdot \Delta P_E$$

Thus, the above condition (9) is equivalent to the following condition:

$$Q_E - S_E'^2 \cdot \Delta P_E > Q_C - S_C'^2 \cdot \Delta P_C$$

Thus, by satisfying the conditions (9) and (10), more preferably, (9') and (10'), it is possible to effectively reduce the unevenness in pitch.

In the above description of the conditions (7) through (10), the values $\Delta P_E$, $Q_E$, $Q_E'$ and $S_E$ are assumed to be values related to the furthest optical path in the effective scanning region. The furthest optical path in the effective scanning region is to be found on the optical scanning starting side and the optical scanning ending side. As stated above, according to the arrangement of the optical system, it is possible for the sag to be symmetrically generated on either side of the reflecting position M(0). In that case, the values $\Delta P_E$, $Q_E$, $Q_E'$ and $S_E$ are the same with respect to the furthest optical path on the scanning start side and the scanning end side.

Generally speaking, however, the sag condition is generated asymmetrically on either side of the reflecting position M(0), so that, to satisfactorily reduce the pitch unevenness, it is desirable to use values of $\Delta P_E$, $Q_E$, $Q_E'$ and $S_E$ at the most remote optical path on the side on which the sag condition is larger. When the deflection of the deflected beam is not symmetrical with respect to the optical axis of the gradient-index lens, and the distance traveled through the lens differs between the two furthest optical paths, the longer the distance traveled through the gradient-index lens, the larger the variation in power due to the refractive index distribution, so that it is desirable to use the above values of $\Delta P_E$, $Q_E$, $Q_E'$ and $S_E$ in the most remote optical path on the side on which the distance traveled through the gradient-index lens by the deflected beam is longer.

A specific example of a preferred embodiment will now be described.

In this example of a preferred embodiment, the optical scanning device shown in FIG. 16(a) is preferably used.

A semiconductor laser 10 emits a laser beam having a wavelength of about 780 nm. A coupling lens 12 couples the beam from the semiconductor laser 10 and forms it into a slightly converging beam. A polygon mirror 18 preferably has six deflecting reflective surfaces, and the radius of the inscribed circle with respect to the deflecting reflective surfaces is preferably about 18 mm.

The main beam from the light source, which forms a linear image elongated in the main scanning direction by a cylindrical lens 16, is incident on the polygon mirror 18 from a direction which is about 60° with respect to the optical axis of the lens 20 of the scanning imaging system. When the main beam of the deflected beam coincides with the optical axis of the lens 20 and when the sag is zero, the linear image is formed on the deflecting reflective surface.

Assuming that there is no refractive action of another optical system, the slightly converging beam coupled by the coupling lens 12 converges at a position which is about 308.6 mm as measured from the deflecting reflective surface position along the optical axis of the lens 20 toward the scanning surface 22. The effective scanning region W is about 210 mm.

The following data gives the paraxial radius of curvature Rm in the main scanning cross-section of the lens 20, the distance D in the optical axis from the deflecting reflective surface (the position where the sag is zero) to the scanning surface, and the refractive index $N_0$ of the material of the lens 20.

|  | Rm | D | $N_0$ |
| --- | --- | --- | --- |
| Deflecting surface | — | 48.06 | — |
| Incident surface | 199.5 | 20.00 | 1.51933 |
| Exit surface | −216.0 | 106.64 | — |

The shapes of both sides of the lens 20 in the main scanning cross-section are preferably aspherical, and, in the well-known equation related to aspherical surfaces, the configuration is specified by giving the Rm (paraxial curvature radius), K, and A through D:

$$X = Y^2 / \left[ Rm + Rm\sqrt{\{1 - (1+K)(Y/Rm)^2\}} \right] +$$
$$AY^4 + BY^6 + CY^8 + DY^{10} + \ldots$$

where Y is the coordinate in the main scanning direction (the position of the optical axis is the origin) and X is the coordinate in the optical axis direction.

The configuration of the incident surface of the lens 20 in the main scanning cross-section is:

Rm=199.5, K=−35.1384, A=−1.985E−7,

B=2.169E−11, C=1.902E−15,

D=−1.880E−19

The configuration of the exit surface of the lens 20 in the main scanning cross-section is:

Rm=−216.0, K=2.106, A=−3.709E−7,

B=1.713E−11, C=−5.930E−15,

D=1.480E−18

The configuration of the lens 20 in the plane which is perpendicular to the main scanning direction on either side is expressed by specifying the radius of curvature in the plane in accordance with the above Y-coordinate in the following polynomial by giving the radius of curvature in the optical axis Rs and the coefficient $b_n$, $$Rs(Y)=Rs+\Sigma b_n \cdot Y^n (n=1,2,3,\ldots)$$

The radius of curvature in the plane which is perpendicular to the main scanning direction of the incident surface of the lens 20:

Rs=−40.03, $b_2$=−1.1900E−2, $b_4$=1.6780E−5, $b_6$=−1.7646E−8, $b_8$=9.9902E−12, $b_{10}$=−2.8355E−15, $b_{12}$=3.1540E−19

The curvature radius in the plane orthogonal to the main scanning direction of the exit surface of the lens 20:

Rs=−15.76, $b_1$=−4.0244E−4, $b_2$=−1.0448E−3, $b_3$=1.6834E−6, $b_4$=7.8853E−7, $b_5$=−4.0206E−10, $b_6$=−1.0976E−10

Figure 20A:
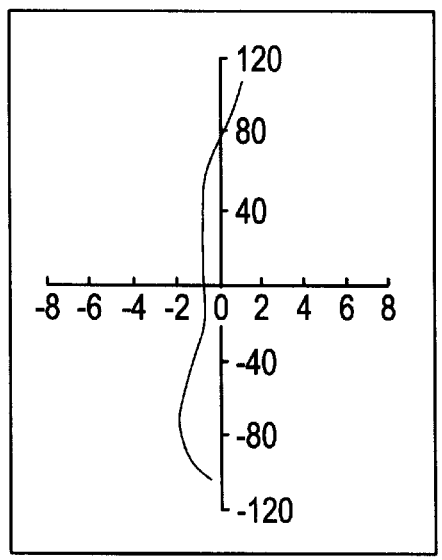
FIG. 20(a) is a diagram illustrating a field of curvature in a main scanning direction according to a preferred embodiment of the present invention.
Figure 20B:
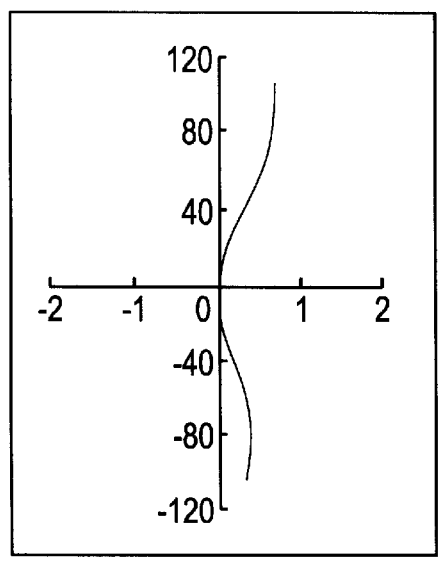
FIG. 20(b) is a diagram illustrating constant speed characteristics of a preferred embodiment of the present invention.
Figure 20C:
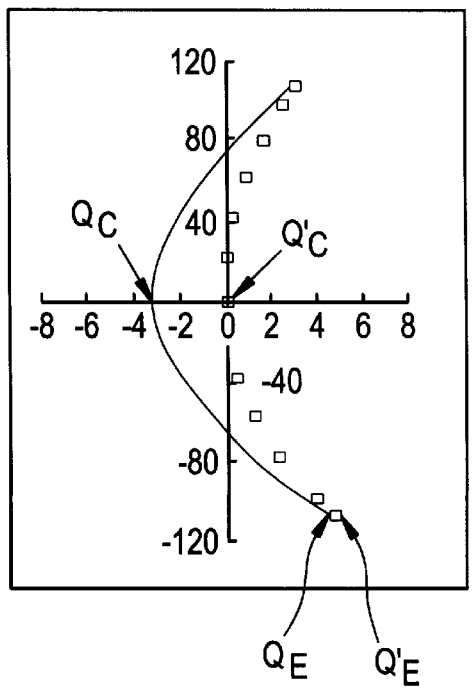
FIG. 20(c) is a diagram illustrating a field of curvature in a sub-scanning direction according to a preferred embodiment of the present invention.

FIG. 20(*a*) shows the field curvature in the main scanning direction when there is no refractive index distribution and when the lens 20 specified by the above data is used. FIG. 20(*b*) shows the constant speed characteristics calculated by the fθ characteristic formula, and FIG. 20(*c*) shows the field curvature in the sub-scanning direction.

The above data and optical characteristics in the example of the preferred embodiment are determined and designed by taking into account beforehand the non-uniformity of refractive index in the lens 20. The solid line in FIG. 20(*c*) shows the above-mentioned Q.

In this example of a preferred embodiment, the values of the parameters in the conditions (7) through (10) are as follows:

$|P_C|$=3.22E−4, $|P_E|$=0

$Q_E$4.72 mm, $Q_C$=−3.27 mm, $Q_E'$ =4.72 mm, $Q_C'$=−0.05 mm, $Q_E - S_E'^2 \cdot \Delta P_E$=4.72 mm, $Q_C - S_C'^2 \cdot \Delta P_C$=−0.06 mm Thus, the example of preferred embodiments satisfies all the conditions (7) through (10).

In the above expressions and data, E and the value following it indicate a power of 10. Thus, "E−9" means $10^{-9}$, this value being multiplied by the value directly preceding it.

FIG. 20(*c*) also shows the field curvature in the sub-scanning direction when there is a refractive index distribution in the lens 20, that is, the actual field curvature in the sub-scanning direction. Dots in FIG. 20(*c*) indicate the positions, each of which is measured at intervals relative to the beam waist position of the deflected beam in the sub-scanning direction. Although these positions are wave-optical imaging positions, these positions are not substantially different from geometrical-optical field curvature. As is obvious from the field curvature (solid line and dots) of FIG. 20(*c*), the conditions (7'), (9') and (10') are satisfied in this example of preferred embodiments of the present invention.

The refractive index distribution does not substantially influence the field curvature in the main scanning direction and the constant speed characteristics shown in FIGS. 20(*a*) and 20(*b*).

Figure 21:
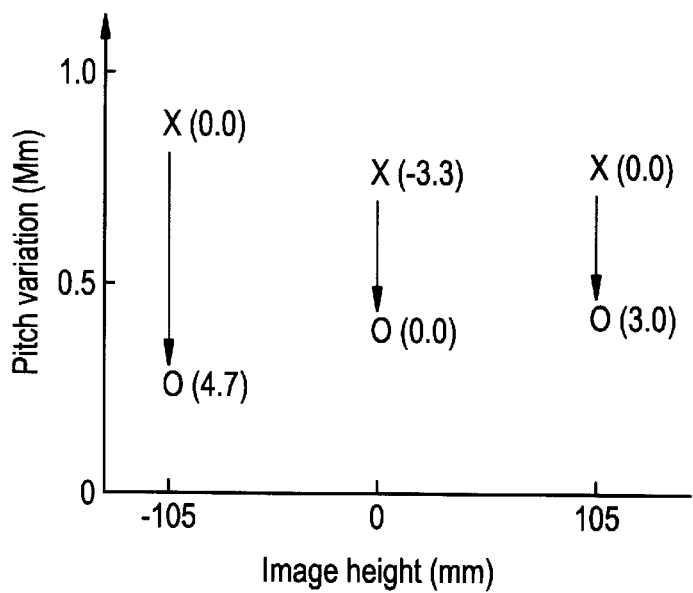
FIG. 21 is a diagram illustrating a pitch unevenness reducing effect of a preferred embodiment of the present invention.

FIG. 21 shows the pitch unevenness characteristics of the above example of the preferred embodiment and a comparative example. The horizontal axis indicates the image height of the light spot, and the pitch unevenness, indicated by the vertical axis, represents the deviation in the sub-scanning direction of the light spot when there is a plane inclination of 60° in the deflecting reflective surface 18A.

In FIG. 6, the symbol "o" indicates the preferred embodiment and the symbol "x" indicates the comparative example. The values in the parentheses by these symbols are the distances of the imaging positions in the sub-scanning direction of the deflected beam as measured from the scanning surface.

Take, for example, the section where the image height is −105 mm. In the comparative example, the deflected beam forms an image at the scanning surface position (Q'=0.0 mm) in the sub-scanning direction. Due to the sag, however, the above-mentioned 60° plane inclination influences the light beam, and the imaging position of the light spot in the sub-scanning direction is deviated by almost 1um in the sub-scanning direction from the imaging position achieved when there is no plane inclination.

In contrast, in the example of the preferred embodiment, the imaging position of the deflected beam in the sub-scanning direction is about 4.7 mm behind the scanning surface. However, the variation of the light spot due to plane inclination is reduced to approximately 0.2 $\mu$m.

Further, at the image height of 0 mm, the imaging position of the light spot in the sub-scanning direction is changed from −3.3 mm (the solid line of FIG. 20(*c*)) to 0 mm (the dot in FIG. 20(*c*), whereby an improvement is achieved in terms of unevenness in scanning line pitch.

Regarding the entire effective scanning region, the deviation of the scanning line due to the above 60° plane inclination is larger than 0.5 $\mu$m in the comparative example, whereas, in the example of the preferred embodiment, it is smaller than 0.5 $\mu$m. That is, the pitch unevenness of the scanning line is satisfactorily corrected in the example of preferred embodiments.

Figure 22:
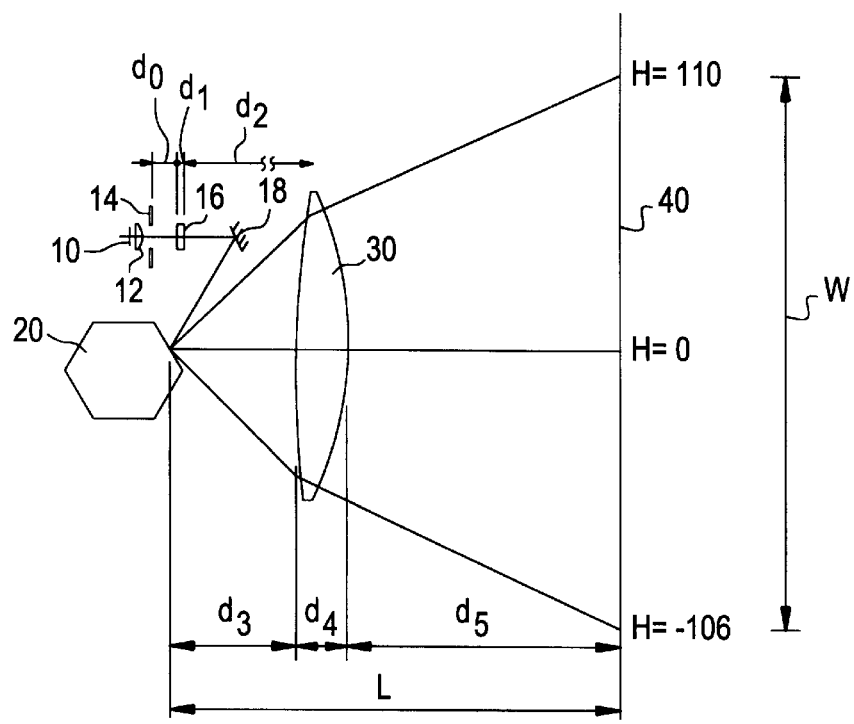
FIG. 22 is a drawing illustrating an example of an optical arrangement of an optical scanning apparatus related to a preferred embodiment of the present invention.

FIG. 22 illustrates another example of an optical scanning apparatus using an optical scanning lens according to further preferred embodiments of the present invention. A light flux emitted from a semiconductor laser functioning as a light source 10 is coupled to a subsequent optical system through a coupling lens 12. The coupled light flux is converted to a parallel or weak divergent or weak converging light flux and is shaped so as to have an appropriate cross sectional shape by intercepting a peripheral portion of the light flux via an aperture 14 for shaping the light flux. The light flux then impinges upon a cylinder lens 16 and is converged in a direction corresponding to a sub-scanning direction (a direction which is perpendicular to FIG. 22) via the cylinder lens 16. The light flux is then reflected by a mirror 18 to form a line image elongated in a direction corresponding to a main scanning direction at a location near a deflecting reflective surface of a polygon mirror which functions as a light deflector 20. The cylinder lens 16 may be replaced with a cylinder concave mirror, if desired.

The light flux is deflected by the light deflector 20 at equiangular velocity and is transmitted to an optical scanning lens 30 to be converged as a light spot on a scanning surface 40, which is a surface to be scanned and where a photoconductive surface of a photoconductor is disposed. Thus, the light flux optically scans the scanning surface 40 at a constant velocity.

The optical scanning lens 30 is formed via a plastics molding process described above, and therefore, has a non-uniform, variable refractive index in the lens. The lens has a tolerance for such a change in the diameter of a light spot that satisfies the above-mentioned conditions (11-m) and (11-s) over the entire effective area of the lens, and thereby variation in the diameter of a light spot according to an image height is suppressed in a range allowable for practical use.

An example of the optical scanning apparatus illustrated in FIG. 22 is now described.

A semiconductor laser having a radiation wave length of 780 nm is used as the light source 10. A light flux emitted from the light source 10 is converged to a weak converging light flux by the coupling lens 12. The aperture 14 has an opening in a shape of a rectangle with a width of about 2.9 mm in a direction corresponding to a main scanning direction and a width of about 1.2 mm in a direction corresponding to a sub-scanning direction.

The light deflector 20 is preferably a hexahedral mirror with an inscribed circle of a radius of about 18 mm and an angle formed by a principal ray of an incident light flux from the light source 10 and the optical axis of the optical scanning lens 30 is about 60 degrees.

When each distance between elements on the optical axis from the aperture 14 to the scanning surface 40 is denoted by $d_i$ (i=0–5) with i as an appended character for specifying a plane, and an incident plane of the cylinder lens 14, an emitting plane of the cylinder lens 14, a deflecting reflective surface of the light deflector 20, a surface of the scanning lens 30 at the side of the light deflector 30 and a surface of the scanning lens at the side of the scanning surface 40 and the scanning surface 40 are respectively denoted by i (i=1–5), and a radius of curvature in the main scanning direction and a radius of curvature in the sub-scanning direction of the cylinder lens 14 and the optical scanning lens 30 are respectively denoted by $R_i$ and $r_i$ with an appended character i for specifying a surface of the lens, and a refractive index of these lens is denoted by N, then an optical arrangement illustrated in FIG. 1 is expressed as follow;

| i | $R_i$ | ri | di | N | |
|---|---|---|---|---|---|
| 0 | | | 10.000 | | (aperture 12) |
| 1 | ∞ | 44.68 | 3.000 | 1.51933 | (cylinder lens surface 1) |
| 2 | ∞ | ∞ | 70.000 | | (cylinder lens surface 2) |
| 3 | ∞ | ∞ | 48.06 | | (deflecting surface) |
| 4 | 199.5 | −40.03 | 20.000 | 1.51933 | (scanning lens surface 1) |
| 5 | −212.0 | −15.973 | 106.94 | | (scanning lens surface 2) |

The light flux coupled by the coupling lens 12 is converged to a weak converging light flux and therefore the natural converging point, which is a virtual position where the coupled weak converging light flux converges by its own converging characteristics, becomes the object point in the main scanning direction of the scanning lens 30. The object point is located at a position about 312 mm towards the scanning surface W from the deflecting reflective surface of the light deflector 30. The width of the scanning surface W is about 216 mm.

The focal distance $f_m$ of the scanning lens 30 in the main scanning direction is about 201.25 mm and the focal distance $f_s$ in the sub-scanning direction is about 39.853 mm. The object distance $S_m$ in the main scanning direction and the object distance $S_s$ in the sub-scanning direction relative to the scanning lens 30 are, respectively, about −257.45 mm and about 61.737 mm.

Both surfaces of the optical scanning lens 30, which are parallel with the main scanning direction, preferably have a non-arc shape, which can be specified by an equation which is widely known as a formula of a non-spherical surface:

$$X = Y^2 / \left[ R + R\sqrt{\{1 - (1 + K_i)(Y/R_i)^2\}} \right] + A_i \times Y^4 + B_i \times Y^6 + C_i \times Y^8 + D_i \times Y^{10} + \cdots$$

where X is the coordinate in the direction of the optical axis, Y is the coordinate in the direction orthogonal to the optical axis, $R_i$ is the above-described paraxial radius of constant.

Then, the paraxial radius of curvature $R_i$ and the constants $K_i, A_i, B_i, C_i, D_i \ldots$ are as follows, where i=4 for the light deflector side and i=5 for the scanning surface side;

[light deflector side]

$R_4$=199.5, $K_4$=−35.1384, $A_4$=−1.9864×10$^{-7}$, $B_4$=2.1692×10$^{-11}$, $C_4$=−1.9018×10$^{-5}$, $D_4$=−1.8800∴10$^{-19}$

[scanning surface side]

$R_5$=−212.0, $K_5$=2.106, $A_5$=−3.7090×10$^{-7}$, $B_5$=1.7132×10$^{-11}$, $C_5$=−5.9300×10$^{-15}$, $D_5$=−1.4940×10$^{-18}$

Further, both surfaces of the scanning lens 30 are shaped such that the radius of curvature: r at a virtual cross section by a plane parallel with the optical axis and the sub-scanning direction changes according to an equation:

$$r_i(Y) = r_i(0) + \Sigma a_{ij} \times Y^{**}2j,$$

where Y is the coordinate in the direction orthogonal to the optical axis, i=4 for the light deflector side and i=5 for the scanning surface side and $Y^{**}2j$ represents Y raised to the 2j-th power.

[light deflector side]

$r_4(0)$=−40.03, $a_{41}$=−1.190×10$^{-2}$, $a_{42}$=1.678×10$^{-5}$ $a_{43}$=−1.7646×10$^{-8}$, $a_{44}$=9.9902×12$^{-12}$ $a_{45}$=−2.8355×10$^{-15}$, $a_{46}$=3.154×10$^{-19}$

[scanning surface side]

$r_5(0)$=−15.973, $a_{51}$=−8.580×10$^{-4}$, $a_{52}$=2.072×10$^{-7}$ $a_{53}$=1.505×10$^{-9}$, $a_{54}$=−1.77196×10$^{-12}$ $a_{55}$=9.1971×10$^{-6}$, $a_{56}$=−2.28×10$^{-19}$ $a_{57}$=2.18171×10$^{-23}$

Figure 23A:
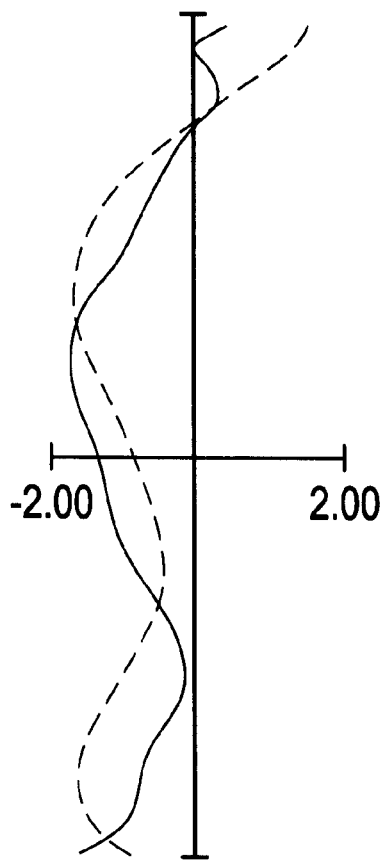
FIG. 23(a) is a diagram illustrating curvature of field characteristics of a scanning lens according to a preferred embodiment of the present invention.
Figure 23B:
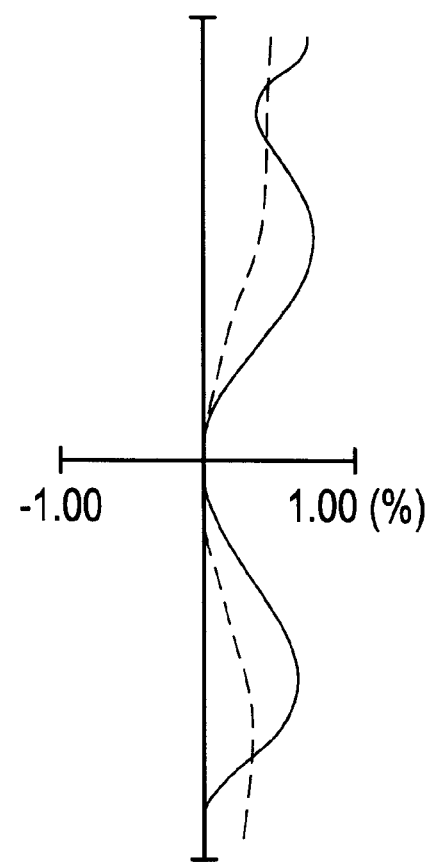
FIG. 23(b) is a diagram illustrating constant velocity characteristics of a scanning lens according to a preferred embodiment of the present invention.

FIGS. 23(a) and 23(b) are diagrams illustrating curvature of field and constant velocity characteristics, respectively, of the example of preferred embodiments of the lens 30 as described above. The dotted line in FIGS. 23(a) and 23(b) represents the characteristics for the main scanning direction and the solid line represents the characteristics for the sub-scanning direction, respectively. The characteristics illustrated in FIGS. 23(a) and 23(b) illustrate a case where an effect of variation in the refractive index of the lens is not considered when designing the lens.

Figure 24A:
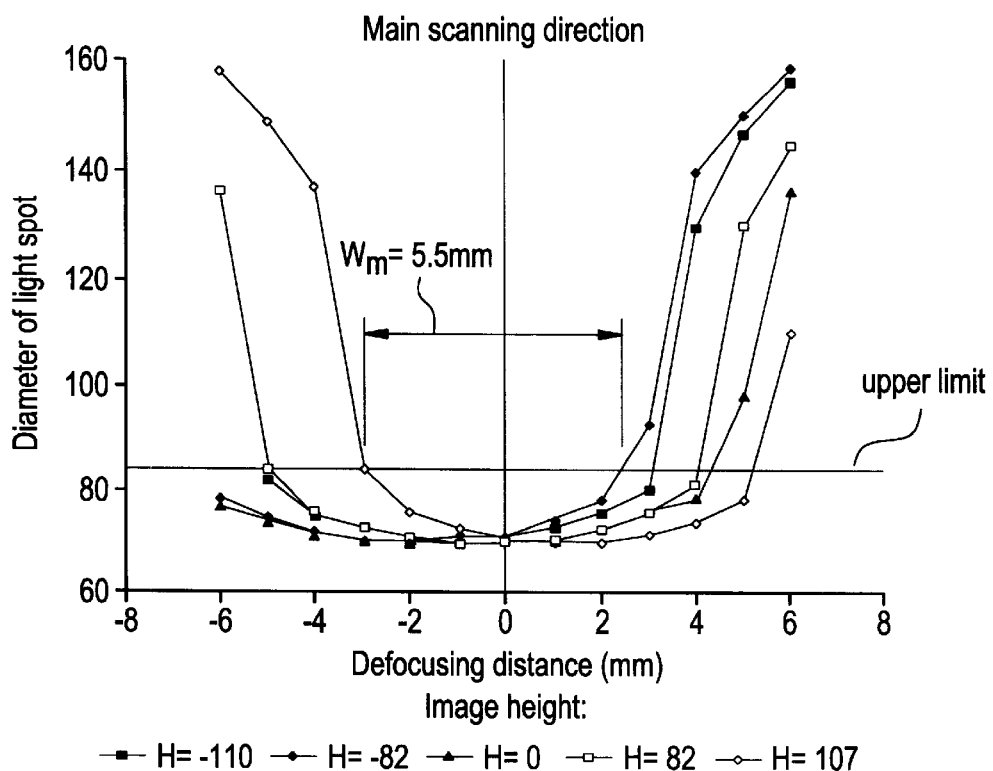
FIG. 24(a) is a diagram illustrating a tolerance for change in diameter of a light spot with respect to a main scanning direction.
Figure 24B:
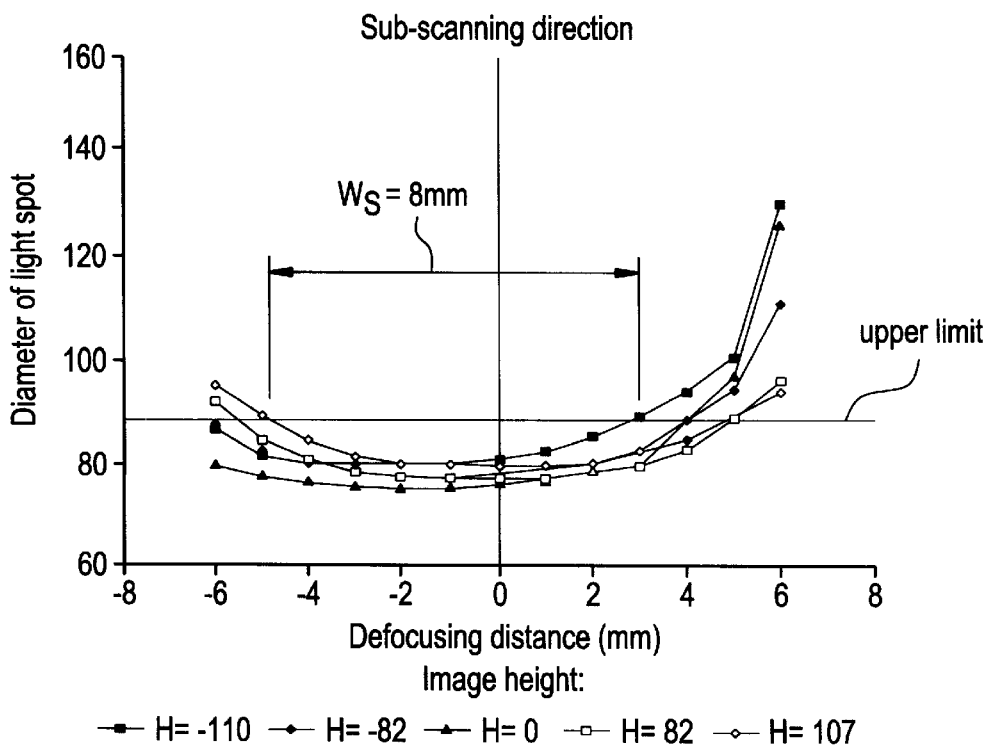
FIG. 24(b) is a diagram illustrating a tolerance for change in diameter of a light spot with respect to a sub-scanning direction.
Figure 25A:
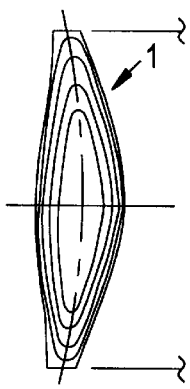
FIG. 25(a) is a schematic diagram illustrating an example of a distribution of refractive indices in a scanning lens according to a preferred embodiment of the present invention.
Figure 25B:
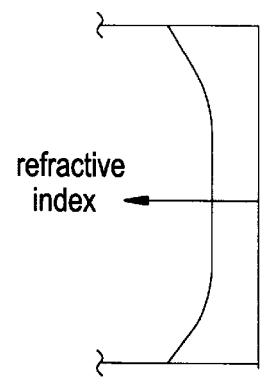
FIG. 25(b) is a drawing illustrating a distribution of refractive indices in the main scanning direction at the virtual cross section illustrated in FIG. 25(a) at the center portion of the thickness-wise direction of the lens, which is indicated by a line-and-dot line in FIG. 25(a)
Figure 25C:
FIG. 25(c) is a drawing illustrating a distribution of refractive indices of the lens 1 in the sub-scanning direction at a virtual cross section of the lens 1 in a plane including the optical axis and parallel to the sub-scanning direction, illustrated via contour lines.
Figure 25E:
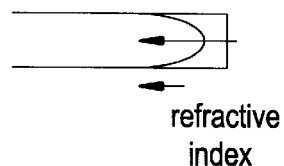
FIG. 25(d) is a drawing illustrating a distribution of refractive indices at the virtual cross section in a plane parallel to the sub-scanning direction including the optical axis.
Figure 25D:
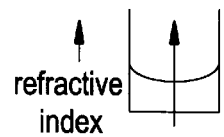
Figure 26:
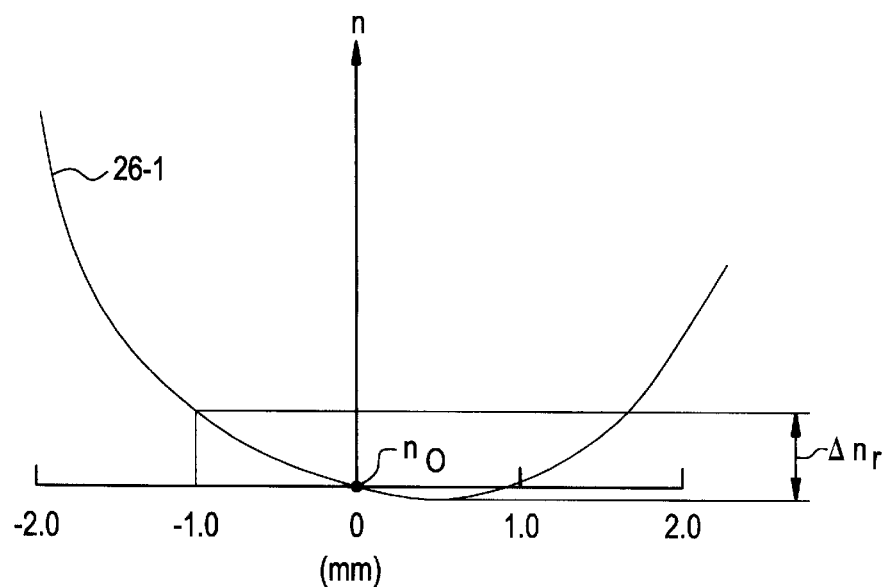
FIG. 26 is a diagram illustrating an example of a change in diameter of a light spot caused by variation in a refractive index of the scanning lens.
Figure 27:
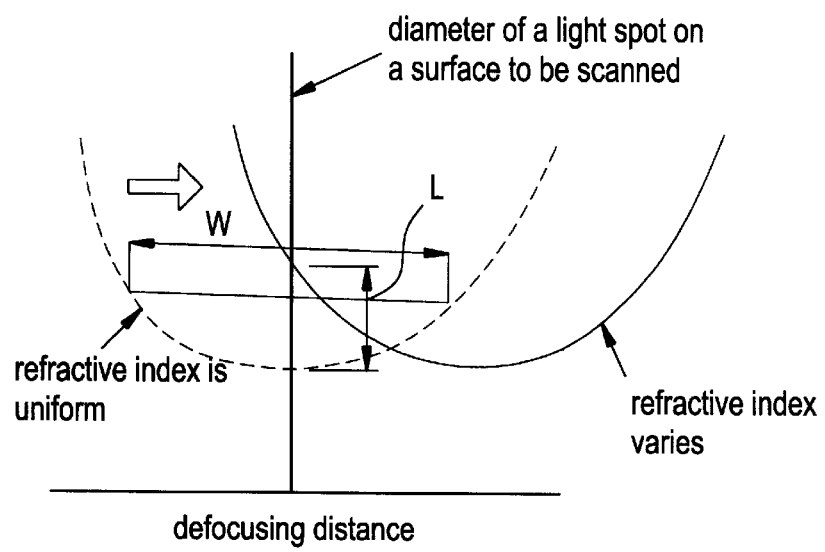
FIG. 27 is a diagram explaining an effect of variation of the refractive index of a focal distance and an image forming position of a scanning lens.
Figure 28:
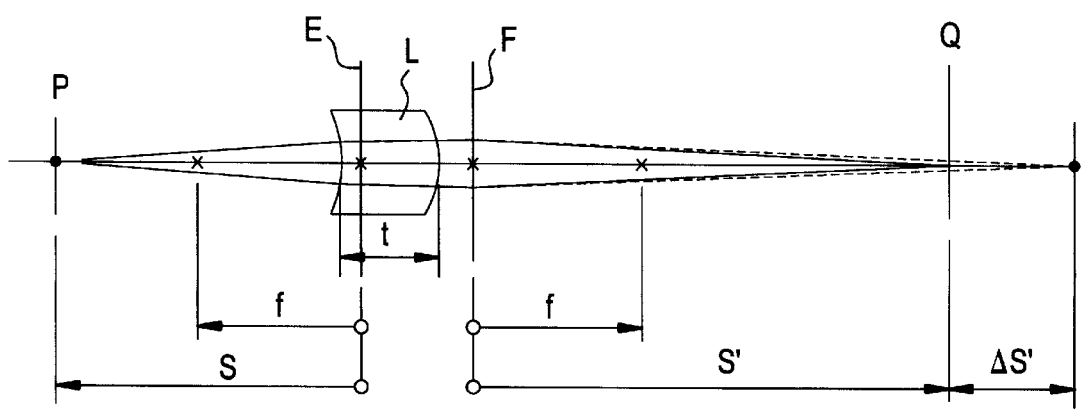

FIGS. 24(a) and 24(b) are a diagram illustrating changes in the diameter of a light spot, which is defined by an area having a light intensity of 1/e$^2$, relative to defocusing distance, at an image height of −110 mm, −82 mm, 0 mm, 82 mm and 107 mm. These changes are obtained from a line spread function (LSF) through simulation of the data described above. FIG. 24(a) illustrates the changes in the main scanning direction and FIG. 24(b) the changes in the sub-scanning direction. In FIGS. 24(a) and 24(b), the solid line denoted as an upper limit indicates a maximum value line of the range of ±10% of the criterion diameter for the light spot. Because the range of defocusing distance, in which the diameter of a light spot is below the upper limit over the whole effective scanning area of the lens, is the tolerance for change in the diameter of a light spot $\omega_0$ of the lens, the tolerance for change in the diameter of a light spot $\omega_0$ in the main scanning direction is about 5.5 mm and the tolerance for change in the diameter of a light spot $\omega_s$ in the sub-scanning direction is about 8 mm, as indicated in the drawings. Accordingly, the condition according to one aspect of preferred embodiments of the present invention, $\omega_m < \omega_s$, is satisfied.

Because the maximum thickness of the lens is preferably about 20.00 mm, the left member of the condition (11-m), $\omega_m/(2t)$, becomes $5.5/(2\ 20.0)=0.14$, and the right member becomes as follows:

$$|\{(-257.45 \times 201.25)/(-257.45-201.25)\}^2 \Delta n_{rm}| \quad (11\text{-}m1)$$

Further, the left member of the condition (11-s), $\omega_s/(2t)$, becomes $8/(2\ 20.0)=0.2$, and the right member becomes as follows:

$$|\{(61.737 \times 39.853)/(61.737-39.853)\}^2 \times \Delta n_{rs}| \quad (11\text{-}s1)$$

According to various simulations and measurements, the amount of variation in the refractive index $\Delta n_{rm}$ is $\alpha \times 10^{-6}$, and therefore it is confirmed that $\alpha$ is smaller than 9.5 and $\beta$ is larger than 5. The amount of variation in the refractive index $\Delta n_{rs}$ is $\beta \times 10^{-5}$, and $\beta$ is smaller than 3.

If $\Delta n_{rm}$ is assumed to be $9 \times 10^{-6}$ as in the condition (11-m1) and $\Delta n_{rs}$ is assumed to be $1 \times 10^{-5}$ as in the condition (11-s1), then the right member of (11-m1) is 0.1148 and the right member of the condition (11-s1) is 0.126, and therefore both conditions described above are satisfied.

Thus, even when the scanning lens 30 has variation in the refractive index, variation in the diameter of a light spot is suppressed within the range of ±10% of the criterion diameter of the light spot.

In the above example, curvature of field in the main scanning direction is corrected by shaping both surfaces of the lens in a plane including the optical axis parallel to a direction corresponding to the main scanning direction to a non-arc shape and curvature of field in the sub-scanning direction is corrected by changing the radius of curvature in a plane parallel to the optical axis and the sub-scanning direction according to a distance from the optical axis of the lens.

Further, when a deflecting angle of a deflected light flux is denoted by $\theta$, the lateral magnification $\beta(\theta)$ in the effective scanning area of the lens is made to satisfy a condition:

$$0.95|\beta(0)| \leq |\beta(0)| \leq 1.05|(0)|$$

and thereby the tolerance for change in the diameter of a light spot which satisfies the conditions (11-m) and (11-s) is accomplished.

In addition to variation in the refractive index as described above, when a scanning lens is fabricated via a plastics molding process, internal stress remains inside the lens during a process of cooling after the completion of molding because the optical anisotrophy constant of plastics is large, and this creates double refraction in the lens. The lens having double refraction tends to cause wave-front aberration to a transmitting light flux. The wave-front aberration increases the beam west diameter which defines the diameter of a light spot, causing variation of the diameter of a light spot.

In order to reduce variation in the diameter of a light spot due to double refraction of the lens, it is desirable to make retardation $\Delta R_r$, which is caused by double refraction, below the wave length $\lambda$ of a deflected light flux. The variation in the diameter of a light spot is further reduced by incorporating such correction to the retardation.

In the above example, tolerance for change in the diameter of a light spot is defined, as an example, so as to define a range of change in the diameter of a light spot within ±10% of a criterion diameter over the effective scanning area of the lens, wherein the diameter of an area having $1/e^2$ intensity in a light spot at a zero image height position is preferably defined as the criterion diameter for a light spot. However, even when variation of the diameter of a light spot is greater than ±10% of the criterion diameter, there may be a case that such variation is within an allowable range for practical use.

As described above, in accordance with preferred embodiments of the present invention, it is possible to provide a novel scanning imaging system and an optical scanning device using the same by determining and correcting for a non-uniform distribution of refractive indices in an optical scanning and image forming lens before designing and manufacturing the lens.

In the scanning imaging system of preferred embodiments of the present invention, the scanning imaging system is designed so as to achieve a predetermined, desired optical performance characteristic(s) by taking into account the refractive index in the gradient-index lens during design and before manufacture thereof, so that, it is possible to effectively achieve a minimum beam spot diameter, in a sub-scanning direction, within a desired range; to reduce variation in a scanning line pitch; and to reduce variation in beam spot diameter according to an image height for every point along a scanning surface, which variations are caused by non-uniformity of the refractive index in a lens used in the optical scanning imaging system. Thus, with the preferred embodiments of the present invention, an appropriate spherical aberration for producing a sufficiently small or minimum diameter of a light spot and within a desired range of tolerance is achieved despite the non-uniformity in refractive index inside a scanning and image forming lens. Moreover, a spherical aberration in a direction of sub-scanning of the scanning and image forming lens is corrected more effectively such that a diameter of a light spot in the direction of sub-scanning is reduced more effectively as compared to conventional lenses.

In addition, even when a lens including a non-uniform distribution of refractive indices is included in a scanning and image forming lens system, an accompanying deterioration of a curvature of field is effectively minimized. Even when the internal distribution of refractive indices is uncertain, the accompanying uncertainty in curvature of field is suppressed.

Also, even when a scanning and image forming lens includes a non-uniform refractive index therein and such a lens is included in a scanning and image forming lens system, as long as the magnitude of non-uniformity falls within a certain range, the lens or lens system can be used in practice. Consequently, the yield of the scanning and image forming lens or the scanning and image forming lens system can be improved, the cooling time required for plastics molding for forming the lens can be shortened, and the efficiency in forming a normal image via the scanning and image forming lens or the scanning and image forming lens system can be improved. Consequently, the cost of the lens and even the cost of an optical scanning apparatus incorporating such a lens can be minimized.

While the invention has been particularly shown and described with reference to preferred embodiments thereof, it will be understood that numerous additional modifications and variations and changes in form and details may be made therein without departing from the spirit of the invention. It is therefore to be understood that within the scope of the appended claims, the present invention may be practiced otherwise than as specifically described herein.

What is claimed is:

1. A lens for an optical scanning apparatus, the lens comprising:

at least one lens having a distribution of different refractive indices;

the at least one lens having a shape and arrangement of the distribution of different refractive indices such that a beam spot diameter produced by the lens on a scanned surface is within a range of tolerance of about 10% to about 25% of a minimum beam spot diameter.

2. The lens according to claim 1, wherein the lens comprises only a single lens.

3. The lens according to claim 1, wherein the lens comprises at least two lenses.

4. An optical scanning apparatus in which a light beam emanating from a light source is converged to form a line image elongated in a direction of main scanning via a first image formation optical apparatus, deflected by a light deflector having a deflecting reflective surface located near an image forming position for the line image, and then converged as a light spot on a surface to be scanned via a second image formation optical system for scanning the surface to be scanned, said second image formation optical system including a scanning and image forming lens that is a single anamorphic lens having a distribution of different refractive indices in a direction of sub-scanning; wherein assuming that a refractive index on the optical axis of said scanning and image forming lens is $n_0(0)$, the distribution of refractive indices is reproduced by an approximate expression of $n(z)=n_0(0)+\Delta n(0) \times z^2$ in relation to a distance z from the optical axis in a direction of sub-scanning; and assuming that the radii of curvature on the surfaces of said scanning and image forming lens facing said light deflector and scanned surface within said section of sub-scanning are $r_{S1}(0)$ and $r_{S2}(0)$, respectively, the thickness of said lens is d, a focal length in the direction of sub-scanning calculated using the radii of curvature $r_{S1}(0)$ and $r_{S2}(0)$, the thickness d, and the refractive index $n_0(0)$ is $f(0)$, a distance from the position of image formation for the line image to a front principal point in the direction of sub-scanning of said scanning and image forming lens is $S_0(0)$, a distance from a rear principal point to said scanned surface is $S_L(0)$, $\Delta n(0)$ is a constant, and the tolerance for change of the diameter of a light spot in the direction of sub-scanning is $\omega_0$, the following condition is satisfied:

$$\left| 1 \Big/ \left[ \{1/f(0)\} - 2\Delta n(0) \times d - \left\{ 1 \Big/ \frac{S_L(0)}{S_0(0)} \right\} \right] - S_L(0) \right| < \omega_0 / 2.$$

5. The lens according to claim 4, wherein assuming that a half width of a deflected light beam in the direction of sub-scanning impinged on the surface of the lens is Z, the following condition is satisfied:

$$0 < Z^2 \Delta n(0) \leq 1.1 \times 10^{-4}.$$

6. An optical scanning apparatus comprising:

at least one lens having a distribution of different refractive indices;

the at least one lens having a shape and arrangement of the distribution of different refractive indices such that a beam spot diameter produced by the lens on a scanned surface is within a range of tolerance of about 10% to about 25% of a minimum beam spot diameter.

7. An image recording apparatus comprising:

an optical imaging and scanning system including at least one lens having a distribution of different refractive indices;

the at least one lens having a shape and arrangement of the distribution of different refractive indices such that a beam spot diameter produced by the lens on a scanned surface is within a range of tolerance of about 10% to about 25% of a minimum beam spot diameter.

8. A method of forming a lens for use in an optical scanning apparatus, the method comprising the steps of:

determining a distribution of refractive index of the lens before forming the lens;

determining a minimum beam spot diameter;

providing a mold having a shape configured to form at least one lens having a distribution of different refractive indices such that a beam spot diameter produced by the lens on a scanned surface is within a range of tolerance of about 10% to about 25% of the minimum beam spot diameter;

filling the mold with heated liquid plastics material; and allowing the plastics material in the mold to cool.

9. An optical scanning apparatus in which a light beam emanating from a light source is converged to form a line image elongated in a direction of main scanning via a first image formation optical system, deflected by a light deflector having a deflecting reflective surface located near an image forming point for the line image, and then converged as a light spot on a surface to be scanned via a second image formation optical system for scanning the surface to be scanned; wherein said second image formation optical system includes a system of lenses for scanning and image formation having at least two lenses, and at least one lens includes a non-uniform distribution of refractive indices in a direction of sub-scanning; and a lens located closest to said scanned surface has a positive power in the direction of sub-scanning; and assuming that the power in the direction of sub-scanning of one lens facing said light deflector is $P_1$ and the power therein of another lens facing said scanned surface is $P_2$, the following condition is satisfied:

$$P_2 > P_1.$$

10. An optical scanning apparatus according to claim 9, wherein the shape within a section of sub-scanning of one lens facing said scanned surface has a substantially meniscus shape including a concave surface opposed to said light deflector.

11. An optical scanning apparatus in which a light beam emanating from a light source is converged to form a line image elongated in a direction of main scanning via a first image formation optical system, deflected by a light deflector having a deflecting reflective surface located near an image forming position for the line image, and then converged as a light spot on a surface to be scanned via a second image formation optical system for scanning the surface to be scanned, wherein said scanning and image forming lens system of said second image formation optical system is composed of two lenses, and only one lens opposed to said light deflector includes a non-uniform distribution of refractive indices in the direction of sub-scanning; and assuming that a refractive index at the optical axis of said lens opposed to said light deflector is $n_0(0)$, the distribution of refractive indices inside said lens is reproduced by an approximate expression of $n(z)=n_0(0)+\Delta n(0) \times z^2$ in relation to a distance z in the direction of sub-scanning from the optical axis within the section of sub-scanning; and assuming that the radii of curvature on the surfaces of said lens opposed to said light deflector, which face said deflector and scanned surface respectively, within the section of sub-scanning are $r_{S1}(0)$ and $r_{S2}(0)$, respectively, the thickness of said lens is $d_1$, a focal length in the direction of sub-scanning calculated using the radii of curvature $r_{S1}(0)$ and $r_{S2}(0)$, the thickness $d_1$, and the refractive index $n_0(0)$ is $f_1(0)$, a distance from the position of image formation for the line image to a front principal point in the direction of sub-scanning of said lens opposed to said light deflector is $S_0(0)$, a distance from a rear principal point in the direction of sub-scanning of said lens opposed to said light deflector to a front principal point of said lens opposed to said scanned surface is $S_1(0)$, a distance from a rear principal point in the direction of sub-scanning of said lens opposed to said scanned surface to said scanned surface is $S_L(0)$, a focal length in the direction of sub-scanning of said lens opposed to said scanned surface is $f_2(0)$, and the tolerance for change of the diameter of a light spot in the direction of sub-scanning is $\omega_0$, when the equality of equality of $$\Lambda = \left\{1 \Big/ \frac{f(0)}{f_1(0)}\right\} - 2\Delta n(0) \times d_1 - \{1/S_0(0)\} \text{ is}$$

established, the following condition is satisfied:

$$|S_L(0) - 1/[\{1/f_2(0)\} + \{\Lambda/(1-S_1(0)\times \Lambda)\}]| < \omega_0/2.$$

12. An optical scanning apparatus in which a light beam emanating from a light source is converged to form a line image elongated in a direction of main scanning via a first image formation optical system, deflected by a light deflector having a deflecting reflective surface located near an image forming position for the line image, and then converged as a light spot on a surface to be scanned via a second image formation optical system for scanning the surface to be scanned, wherein said scanning and image forming lens system of said second image formation optical system is composed of two lenses, and only one lens opposed to said light deflector includes a non-uniform distribution of refractive indices in the direction of sub-scanning; assuming that a focal length of said lens opposed to the light deflector is $f_1(0)$, a distance from the position of image formation for the line image to a front principal point in the direction of sub-scanning of said lens opposed to said light deflector is $S_0(0)$, a distance from a rear principal point in the direction of sub-scanning of said lens opposed to said light deflector to a front principal point of said lens opposed to said scanned surface is $S_1(0)$, a distance from a rear principal point in the direction of sub-scanning of said lens opposed to said scanned surface to said scanned surface is $S_L(0)$, a refractive index on the optical axis of said lens opposed to said scanned surface $n_0'(0)$, the distribution of refractive indices inside said lens is reproduced by an approximate expression of $n'(z)=n_0'(0)+\Delta n'(0) \times z^2$ in relation to a distance z in the direction of sub-scanning from the optical axis within the section of sub-scanning, and assuming that the radii of curvature on the surfaces of said lens opposed to said scanned surface, which face said deflector and scanned surface respectively, within the section of sub-scanning are $r_{S3}(0)$ and $r_{S4}(0)$ respectively, the thickness of said lens is $d_3$, a focal length in the direction of sub-scanning calculated using the radii of curvature $r_{S3}(0)$ and $r_{S4}(0)$, the thickness $d_3$, and the refractive index $n_0'(0)$ is $f_2(0)$, and the tolerance for change of the diameter of a light spot in the direction of sub-scanning is $\omega_0$, when the equality of $\Lambda' = \{1/f_1(0)\} - \{1/S_0(0)\}$ is established, the following condition is satisfied:

$$|S_L(0) - 1/[\{1/f_2(0)\} + \{\Lambda'/(1-S_1(0)\times \Lambda')\} - 2\Delta n'(0)\times d_3]| < \omega_0/2.$$

13. An optical scanning apparatus in which a light beam emanating from a light source is converged to form a line image elongated in a direction of main scanning via a first image formation optical system, deflected by a light deflector having a deflecting reflective surface located near an image forming position for the line image, and then converged as a light spot on a surface to be scanned via a second image formation optical system for scanning the surface to be scanned, wherein said scanning and image forming lens system of said second image formation optical system is composed of two lenses, and each of said two lenses includes a non-uniform distribution of refractive indices in the direction of sub-scanning; assuming that a refractive index on the optical axis of said lens opposed to said light deflector is $n_0(0)$, the distribution of refractive indices inside said lens is defined by an approximate expression of $n(z)=n_0(0)+\Delta n(0) \times z^2$ in relation to a distance z in the direction of sub-scanning from the optical axis within the section of sub-scanning, and assuming that the radii of curvature on the surfaces of said lens opposed to said scanned surface, which face said deflector and scanned surface respectively, within the section of sub-scanning are $r_{S1}(0)$ and $r_{S2}(0)$ respectively, the thickness of said lens is $d_1$, a focal length in the direction of sub-scanning calculated using the radii of curvature $r_{S1}(0)$ and $r_{S2}(0)$, the thickness $d_1$, and the refractive index $n_0(0)$ is $f_1(0)$, a refractive index on the optical axis of said lens opposed to said scanned surface $n_0'(0)$, the distribution of refractive indices inside said lens is reproduced by an approximate expression of $n'(z)=n_0'(0)+\Delta n'(0) \times z^2$ in relation to a distance z in the direction of sub-scanning from the optical axis within the section of sub-scanning, and assuming that the radii of curvature on the surfaces of said lens opposed to said light deflector, which face said deflector and scanned surface respectively, within the section of sub-scanning are $r_{S3}(0)$ and $r_{S4}(0)$ respectively, the thickness of said lens is $d_3$, a focal length in the direction of sub-scanning calculated using the radii of curvature $r_{S3}(0)$ and $r_{S4}(0)$, the thickness $d_3$, and the refractive index $n_0'(0)$ is $f_2(0)$, a distance from the position of image formation for the line image to a front principal point in the direction of sub-scanning of said lens opposed to said light deflector is $S_0(0)$, a distance from a rear principal point in the direction of sub-scanning of said lens opposed to said light deflector to a front principal point of said lens opposed to said scanned surface is $S_1(0)$, a distance from a rear principal point in the direction of sub-scanning of said lens opposed to said scanned surface to said scanned surface is $S_L(0)$, and the tolerance for change of the diameter of a light spot in the direction of sub-scanning is $\omega_0$, when the equality of equality of $$\Lambda = \left\{1 \Big/ \frac{f(0)}{f_1(0)}\right\} - 2\Delta n(0) \times d_1 - \{1/S_0(0)\}$$

is established, the following condition is satisfied:

$$|S_L(0) - 1/[\{1/f_2(0)\} + \{\Lambda/(1-S_1(0)\times \Lambda)\} - 2\Delta n'(0)\times d_3]| < \omega_0.2.$$

14. A lens for an optical scanning apparatus, the optical scanning apparatus causing a beam from a light source to form a linear image elongated in a main scanning direction, deflecting the beam by a polygon mirror having a deflecting reflective surface in the vicinity of the position where the linear image is formed, and converging the deflected beam on a scanning surface by the scanning apparatus as a light spot to perform optical scanning, the lens comprising:

at least one gradient-index lens having a different refractive index distribution in a sub-scanning direction and which satisfies the following condition:

$Q_E > 0 > Q_C$ wherein an image position in the sub-scanning direction of the deflected beam when the gradient-index lens is assumed to have a uniform refractive index $N_0$ is $Q_C$ at the optical axis and $Q_E$ at a most remote optical path of the effective scanning region, the polygon mirror side being negative when measured from the position on the scanning surface.

15. The lens according to claim 14, wherein the following condition is met:

$|\Delta P_C| > |\Delta P_E|$ wherein the power variation in the sub-scanning direction of the scanning imaging system due to the refractive index distribution is $\Delta P_C$ at the optical axis and $\Delta P_E$ at the most remote optical path of the effective scanning region.

16. An optical scanning apparatus which causes a beam from a light source to form a linear image elongated in a main scanning direction, deflects the beam via a polygon mirror having a deflecting reflective surface located near a the position where the linear image is formed, and converges the deflected beam on a scanning surface by a scanning imaging system as a light spot to perform optical scanning, the scanning imaging system having a gradient-index lens including a non-uniform refractive index distribution in a sub-scanning direction and satisfies the following conditions:

$|\Delta P_C| > |\Delta P_E|$ (1)

$Q_E > 0 > Q_C$ (2)

wherein the power variation in the sub-scanning direction due to the refractive index distribution is $\Delta P_C$ at the optical axis and $\Delta P_E$ at most remote optical path of the effective scanning region, and the image position in the sub-scanning direction of the deflected beam when the gradient-index lens is assumed to have a uniform refractive index $N_0$ is $Q_C$ at the optical axis and $Q_E$ at the most remote optical path of the effective scanning region, the polygon mirror side being negative when measured from the position on the scanning surface.

17. A lens for an optical scanning apparatus, the optical scanning apparatus causing a beam from a light source to form a linear image elongated in a main scanning direction, deflecting the beam by a polygon mirror having a deflecting reflective surface located near a position where a linear image is formed, and converging the deflected beam on a scanning surface as a light spot to perform optical scanning, the lens comprising:

at least one gradient index lens having a non-uniform refractive index distribution in a sub-scanning direction; wherein when the refractive index distribution in the gradient-index lens is taken into consideration, when the image forming position of the deflected beam in the sub-scanning direction is indicated as $Q_E'$ at a most remote optical path of an effective scanning region, the polygon mirror side being negative when measured from a position on the scanning surface, the following condition is satisfied:

$Q_E' > 0$.

18. The lens according to claim 17, wherein when the image forming position of the deflected beam in the sub-scanning direction by the scanning imaging system is denoted as $Q_C'$ at the optical axis and as $Q_E'$ at the most remote optical path of the effective scanning region, the following condition is satisfied:

$Q_E' > Q_C'$.

19. The lens according to claim 17, wherein when the distance from a rear principal point in the sub-scanning direction to an image forming point in the sub-scanning direction is denoted as $S_C'$ at the optical axis and $S_E'$ at the most remote optical path of the effective scanning region, the following condition is satisfied:

$Q_E - S_E'^2 \cdot \Delta P_E > Q_C - S_C'^2 \cdot \Delta P_C$.

20. The lens according to claim 14, wherein $\Delta P_E$ and $Q_E$ are values at the most remote optical path on a side on which a sag condition is larger.

21. The lens according to claim 17, wherein $Q_E'$ and $S_E'$ are values at the most remote optical path on a side on which a sag condition is larger.

22. An optical scanning imaging apparatus, the optical scanning apparatus causing a beam from a light source to form a linear image elongated in a main scanning direction, deflecting the beam via a polygon mirror having a deflecting reflective surface located near a position where a linear image is formed, and converging the deflected beam on a scanning surface as a light spot to perform optical scanning, the apparatus comprising:

at least one gradient index lens having a non-uniform refractive index distribution in a sub-scanning direction; wherein when the refractive index distribution in the gradient-index lens is taken into consideration, when the image forming position of the deflected beam in the sub-scanning direction is indicated as $Q_E'$ at a most remote optical path of an effective scanning region, the polygon mirror side being negative when measured from a position on the scanning surface, the following condition is satisfied:

$Q_E' > 0$.

23. A lens comprising:

at least one lens including a plastic molded body having a non-uniform refractive index along a surface thereof and having a construction so as to include a tolerance for a change in a diameter of a light spot generated via said at least one lens such that variation in the diameter of a light spot according to an image height caused by the non-uniformity of a refractive index in the lens is within a range of about 10% to about 25%.

24. The lens according to claim 23, wherein if a focal distance of the lens is denoted by f, an amount of variation in the refractive index in the lens in a sub-scanning direction, which is substantially perpendicular to an optical axis of the lens is denoted by $\Delta n_r$, a distance from a front principal point to an object point of the lens is denoted by S, a maximum thickness of the lens in an effective scanning area of the lens is denoted by t, a tolerance for change in the diameter of a light spot is denoted by $\omega_0$, then f, n, S, t and $\omega_0$ satisfy, over the effective scanning area of the lens, a condition:

$$\omega_0/(2t) \geq |\{(S \times f)/(S-f)\}^2 \times \Delta n_r|$$

25. The lens according to claim 23, wherein the lens is an anamorphic lens having different powers in a direction corresponding to the main scanning direction and in a direction corresponding to the sub-scanning direction, respectively, the lens establishes an approximate conjugate relationship between a deflecting starting point of the light deflector and the surface to be scanned with respect to the direction corresponding to the sub-scanning direction, and if the focal distance of the lens f, the distance from the front principal point to the object point of the lens S, the tolerance for change in the diameter of a light spot $\omega_0$, the amount of variation in the refractive index of the lens $\Delta n_r$ are respectively denoted by $f_m$, $S_m$, $\omega_m$, $\Delta n_{rm}$, with respect to the direction corresponding to the main scanning direction and by $f_s$, $S_s$, $\omega_s$, $\Delta n_{rs}$ with respect to the direction corresponding to the sub-scanning direction, then these factors satisfy, over the effective scanning area of the lens, conditions:

$$\omega_m/(2t) \geq |\{(S_m \times f_m)/(S_m-f_m)\}^2 \times \Delta n_{rm}|$$

$$\omega_s/(2t) \geq |\{(S_s \times f_s)/(S_s-f_s)\}^2 \times \Delta n_{rs}|$$

26. The lens according to claim 23, wherein $\Delta n_{rm}$ and $\Delta n_{rs}$ satisfy a condition:

$$|\Delta n_{rm}| < |\Delta n_{rs}|$$

and $\omega_m$ and $\omega_s$ satisfy a condition:

$$\omega_m < \omega_s.$$

27. An optical scanning apparatus comprising:
at least one lens including a plastic molded body having a non-uniform refractive index along a surface thereof and having a construction so as to include a tolerance for a change in a diameter of a light spot generated via said at least one lens such that variation in the diameter of a light spot according to an image height caused by the non-uniformity of a refractive index in the lens is within a range of about 10% to about 25%.

* * * * *